US010536929B2

(12) United States Patent
Uchiyama et al.

(10) Patent No.: US 10,536,929 B2
(45) Date of Patent: Jan. 14, 2020

(54) DEVICE AND METHOD IN A PUBLIC LAND MOBILE NETWORK INCLUDING DIRECT COMMUNICATIONS BETWEEN TERMINALS

(71) Applicant: SONY CORPORATION, Tokyo (JP)

(72) Inventors: Hiromasa Uchiyama, Tokyo (JP); Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 154 days.

(21) Appl. No.: 15/541,728

(22) PCT Filed: Mar. 31, 2016

(86) PCT No.: PCT/JP2016/001877
§ 371 (c)(1),
(2) Date: Jul. 6, 2017

(87) PCT Pub. No.: WO2016/163106
PCT Pub. Date: Oct. 13, 2016

(65) Prior Publication Data
US 2018/0027538 A1    Jan. 25, 2018

(30) Foreign Application Priority Data

Apr. 9, 2015 (JP) .................................. 2015-080356

(51) Int. Cl.
*H04W 72/04* (2009.01)
(52) U.S. Cl.
CPC .............................. *H04W 72/0406* (2013.01)
(58) Field of Classification Search
CPC .. H04W 76/14; H04W 72/0406; H04W 72/04
See application file for complete search history.

(56) References Cited

U.S. PATENT DOCUMENTS

| 2011/0258327 | A1* | 10/2011 | Phan ...................... H04W 76/14 709/227 |
| 2014/0301307 | A1 | 10/2014 | Lee et al. |
| 2014/0315562 | A1 | 10/2014 | Lim et al. |

(Continued)

FOREIGN PATENT DOCUMENTS

| WO | 2014/046578 A1 | 3/2014 |
| WO | 2014/069222 A1 | 5/2014 |

(Continued)

OTHER PUBLICATIONS

"Technical Report 3rd Generation Partnership Project; Technical Specification Group Services and System Aspects; Feasibility study for Proximity Services (ProSe) (Release 12)," 3GPP TR 22.803 V12.1.0, Mar. 2013, (45 pp.).
International Search Report dated Sep. 14, 2016 in PCT/JP2016/001877 filed Mar. 31, 2016.

(Continued)

*Primary Examiner* — Kyaw Z Soe
(74) *Attorney, Agent, or Firm* — Xsensus LLP

(57) ABSTRACT

There is provided a device that acquires resource information indicating a radio resource for use in device-to-device (D2D) communication between a first terminal device belonging to a first public land mobile network (PLMN) and a second terminal device belonging to a second PLMN; and controls D2D communication between the first terminal device and the second terminal device based on the resource information.

19 Claims, 20 Drawing Sheets

(56) References Cited

U.S. PATENT DOCUMENTS

| | | | |
|---|---|---|---|
| 2015/0312952 A1 | 10/2015 | Fodor et al. | |
| 2016/0095074 A1* | 3/2016 | Park | H04W 8/005 370/350 |
| 2016/0212784 A1* | 7/2016 | Fujishiro | H04W 72/048 |
| 2017/0215098 A1* | 7/2017 | Huang | H04W 76/14 |

FOREIGN PATENT DOCUMENTS

| | | |
|---|---|---|
| WO | 2014/077745 A1 | 5/2014 |
| WO | 2015/029954 A1 | 3/2015 |
| WO | 2015/053382 A1 | 4/2015 |
| WO | 2016/030953 A1 | 3/2016 |
| WO | 2016/048067 A2 | 3/2016 |

OTHER PUBLICATIONS

European Article 94(3) Communication dated Nov. 14, 2018, issued in corresponding European Application No. 16 732 348.4.

Japanese Office Action dated Nov. 27, 2018, issued in corresponding Japanese Application No. 2015-080356.

QUALCOMM: "Enhanced LTE D2D Proximity Services: Release 13 D2D WI", 3GPP Draft; RP-141905_LTE-ED2D Motivation, 3rd Generation Partnership Project (3GPP), Mobile Competence Centre; 650, Route Des Lucioles; F-06921 Sophia-Antipolis Cedex; France, vol. TSG RAN, No. Maui, USA; Dec. 8, 2014-Dec. 11, 2014 Dec. 2, 2014 (Dec. 12, 2014), XP050898614, Retrieved from the Internet: URL :http://www.3gpp.org/ftp/Meetings_3GPP_SYNC/RAN/Docs/ [retrieved on Dec. 2, 2014].

Kyocera, Consideration of Inter-cell D2D Service[online], 3GPP TSG-RAN WG2# 85bis, 3GPP, Apr. 4, 2014, R2-141386, Retrieval Date [Nov. 20, 2018], Internet <URL: http://www.3gpp.org/ftp/tsg_ran/WG2_RL2/TSGR2_85bis/Docs/R2-141386.zip>.

* cited by examiner

[Fig. 1]
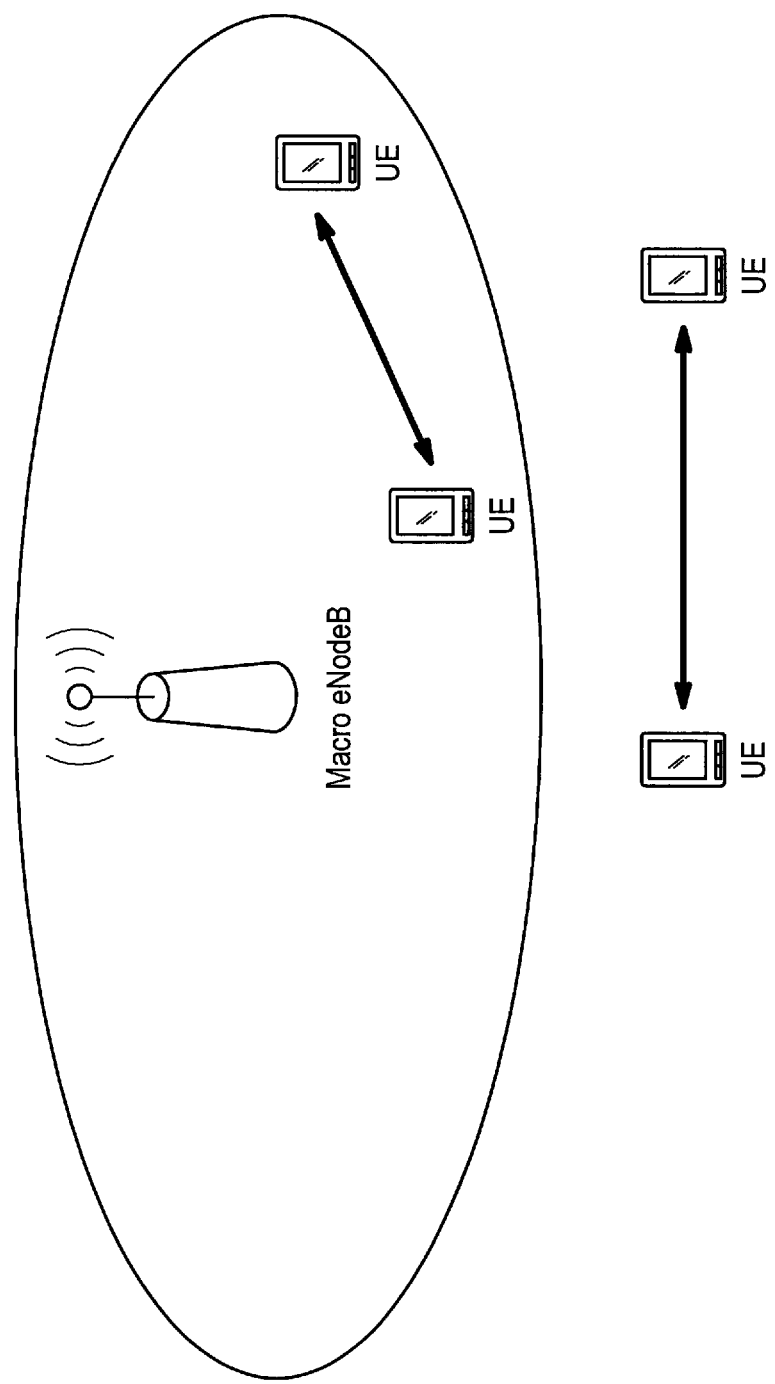

[Fig. 2]
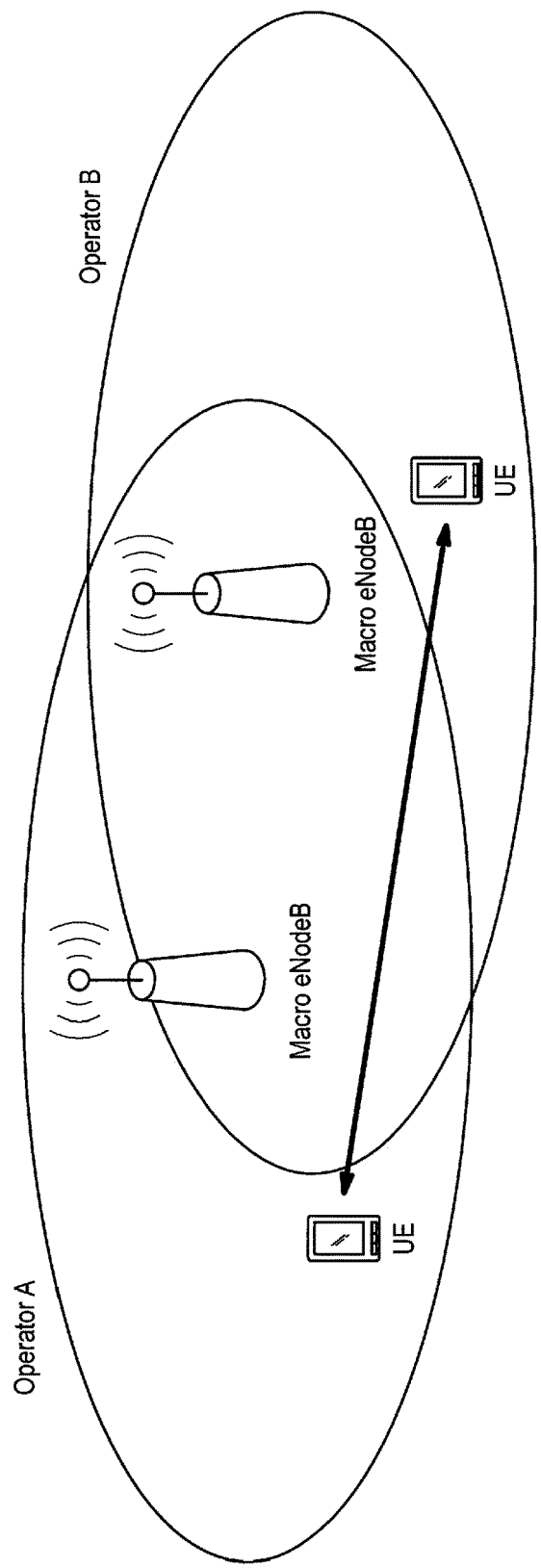

[Fig. 3]
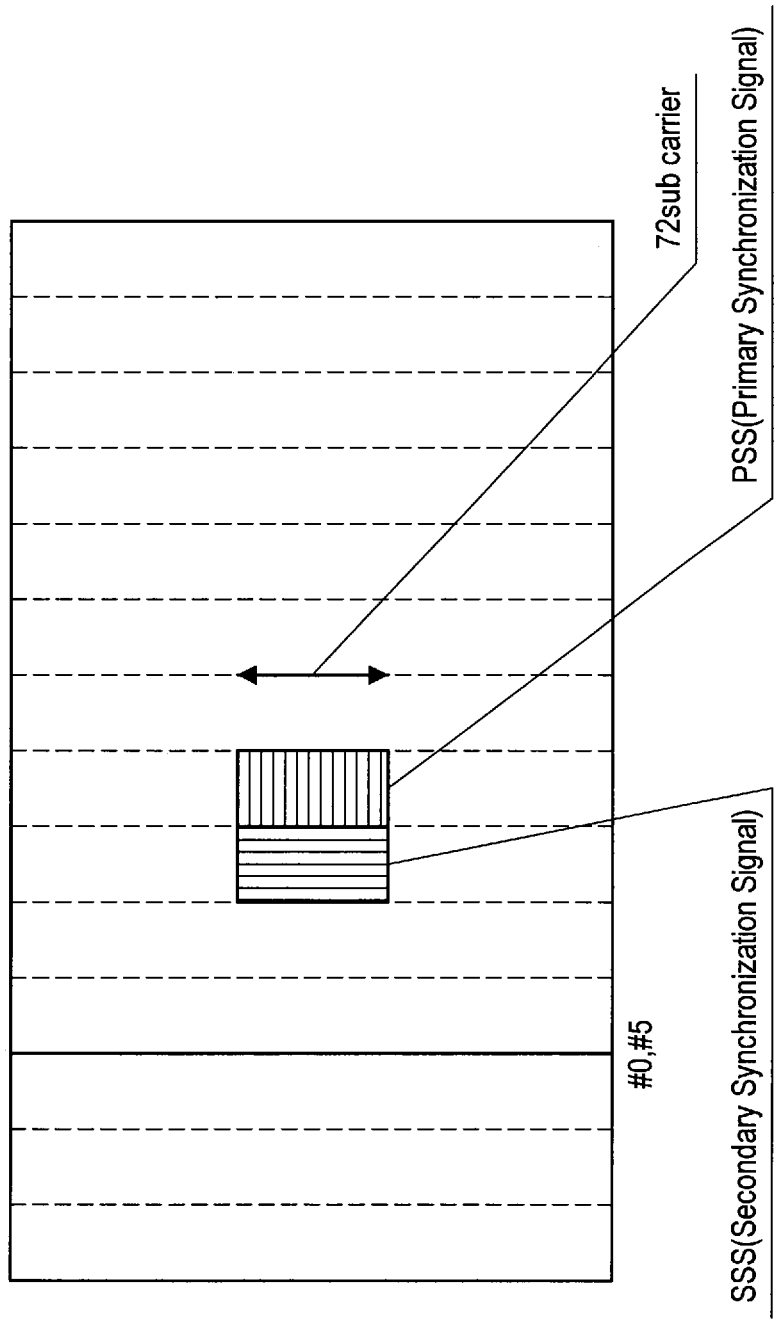

[Fig. 4]
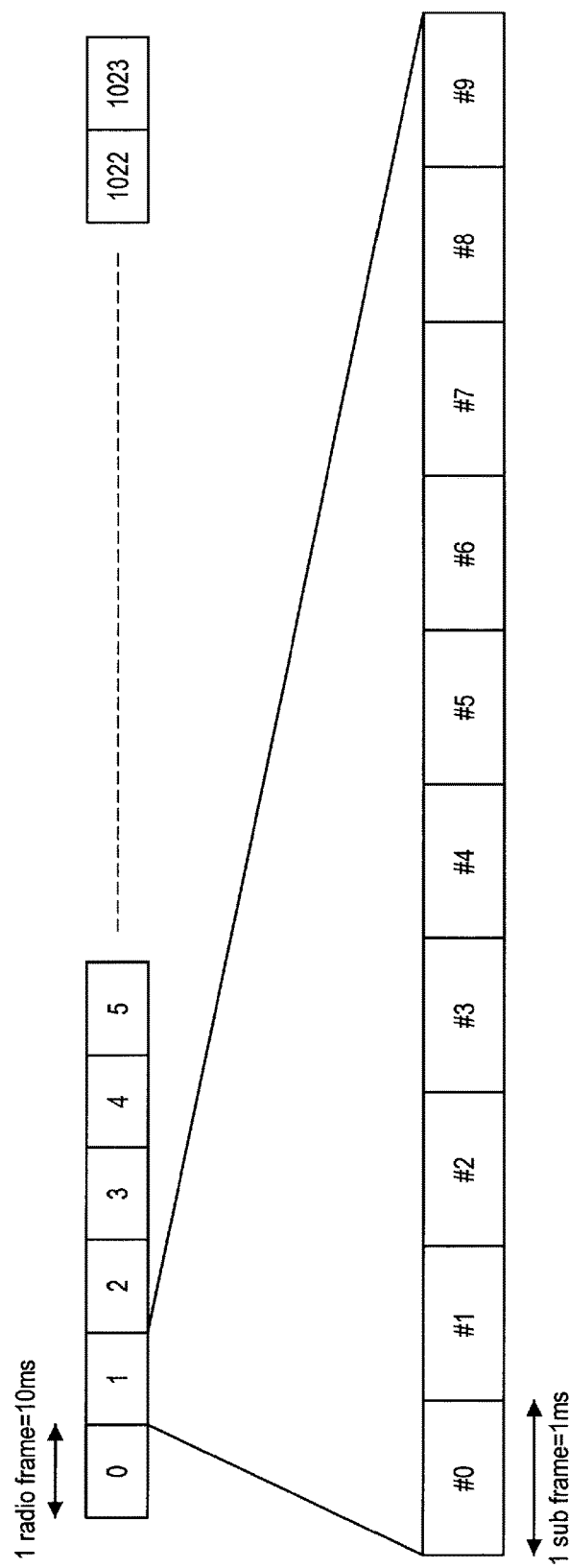

[Fig. 5]
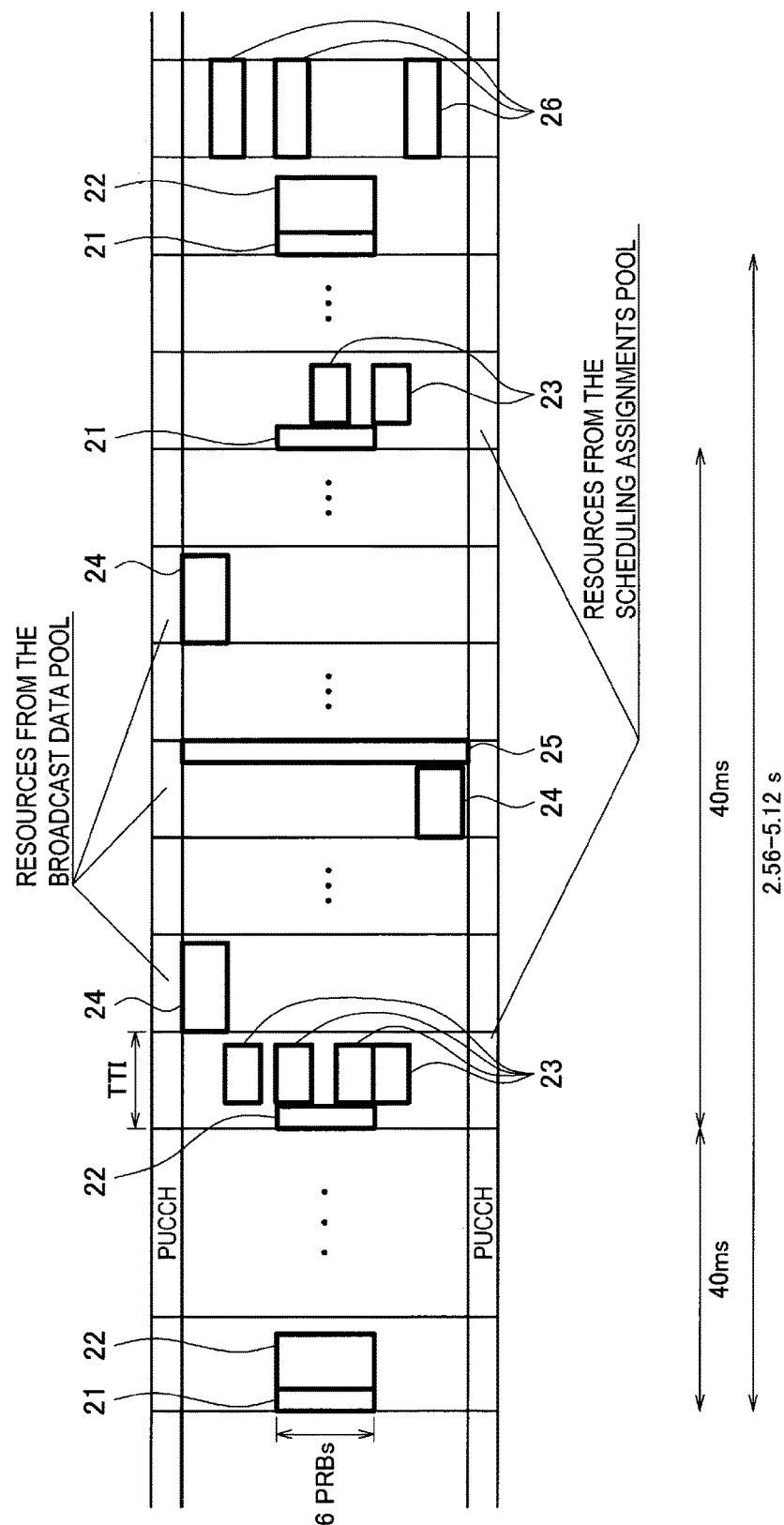

[Fig. 6]
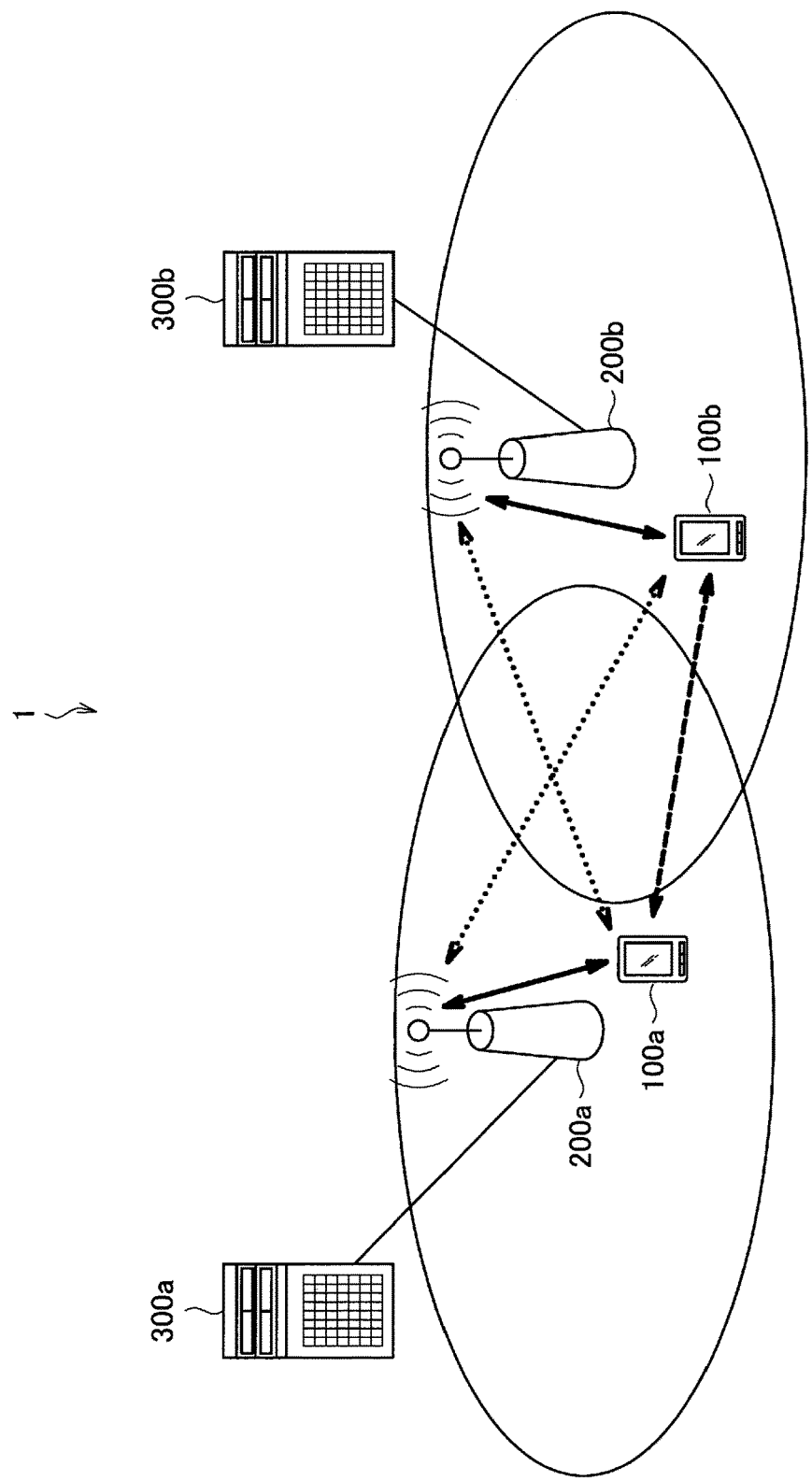

[Fig. 7]
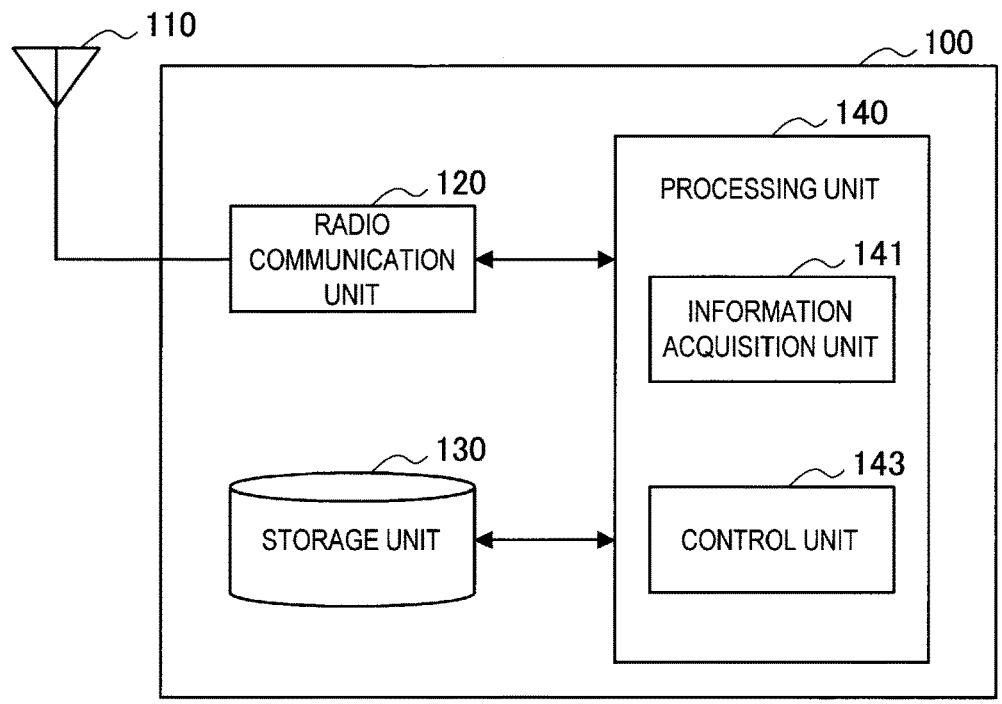
[Fig. 8]
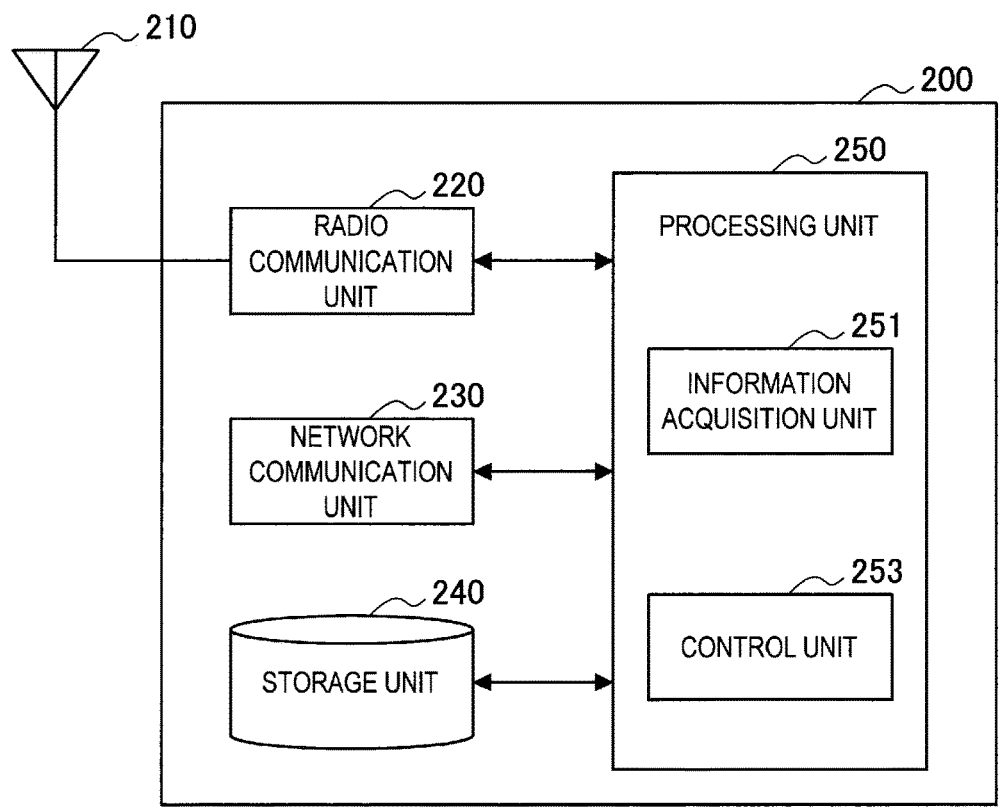

[Fig. 9]
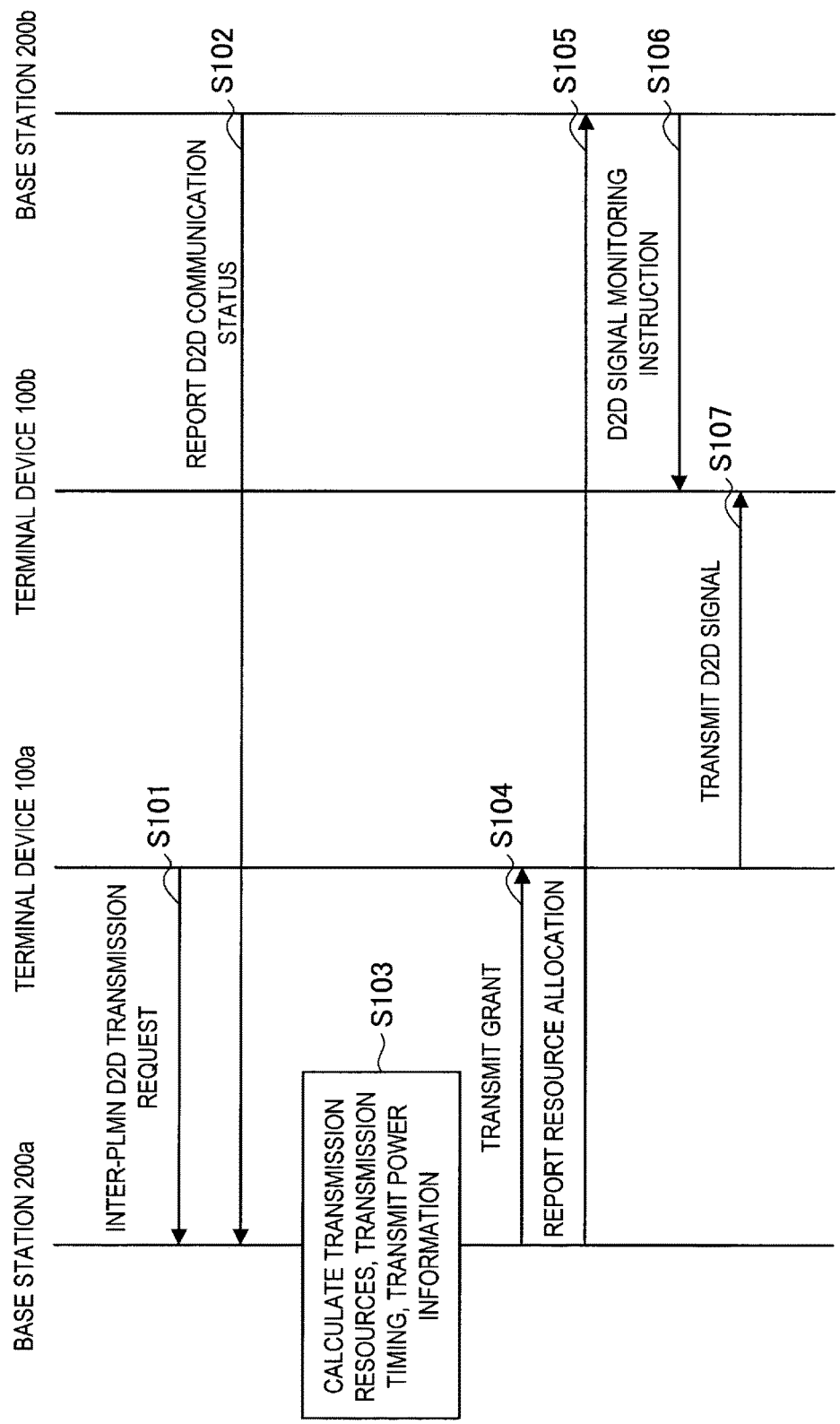

[Fig. 10]
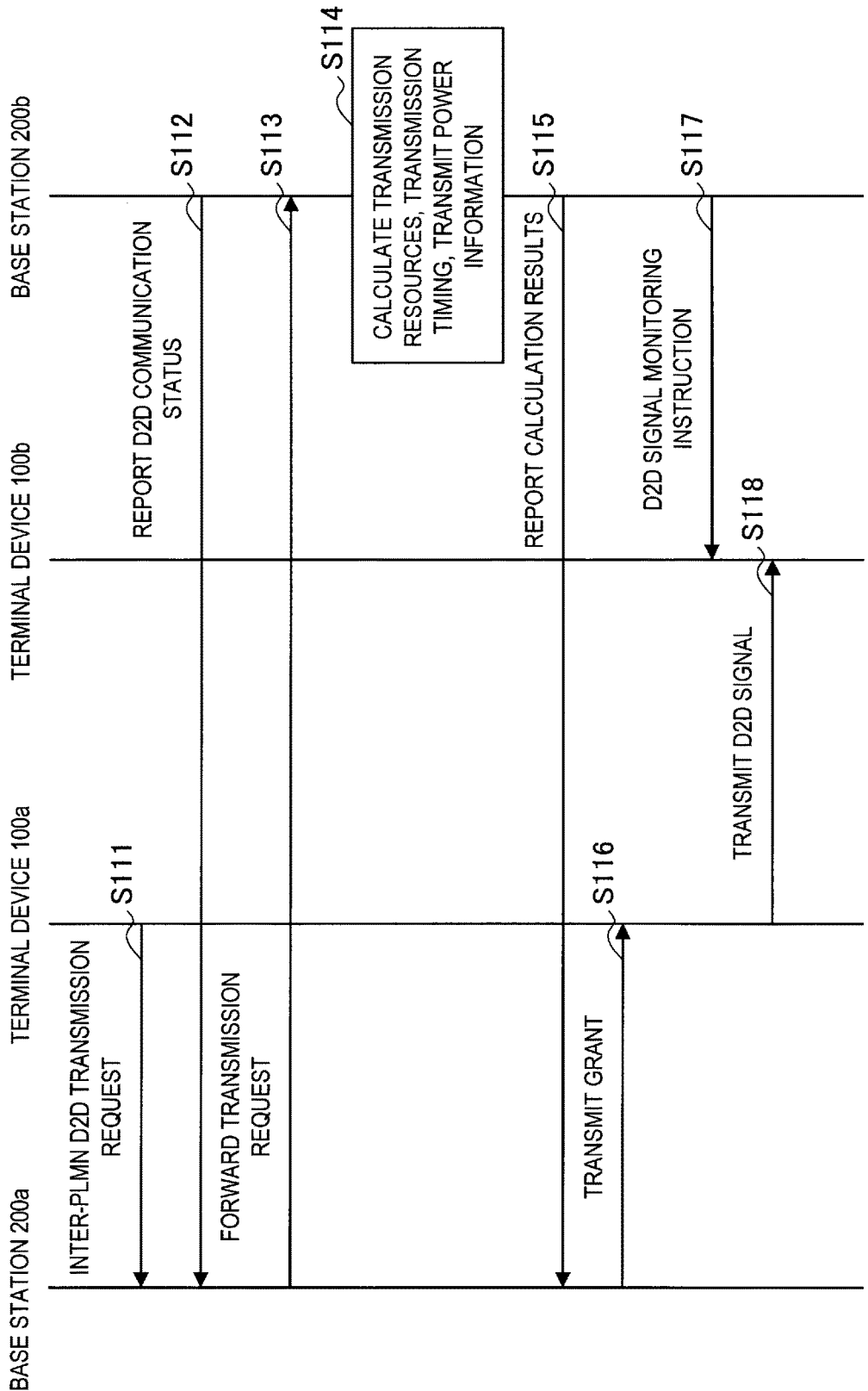

[Fig. 11]
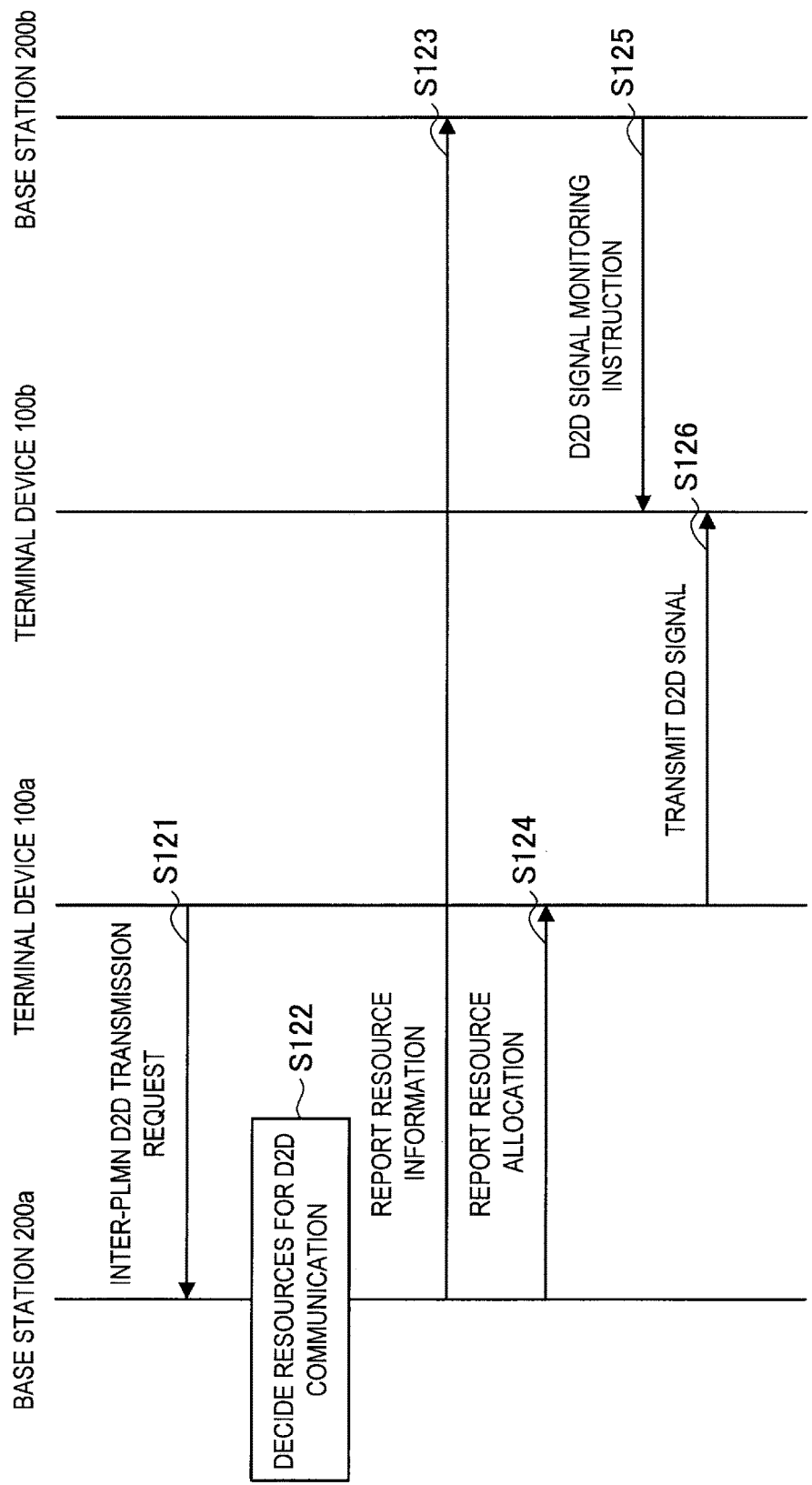

[Fig. 12]
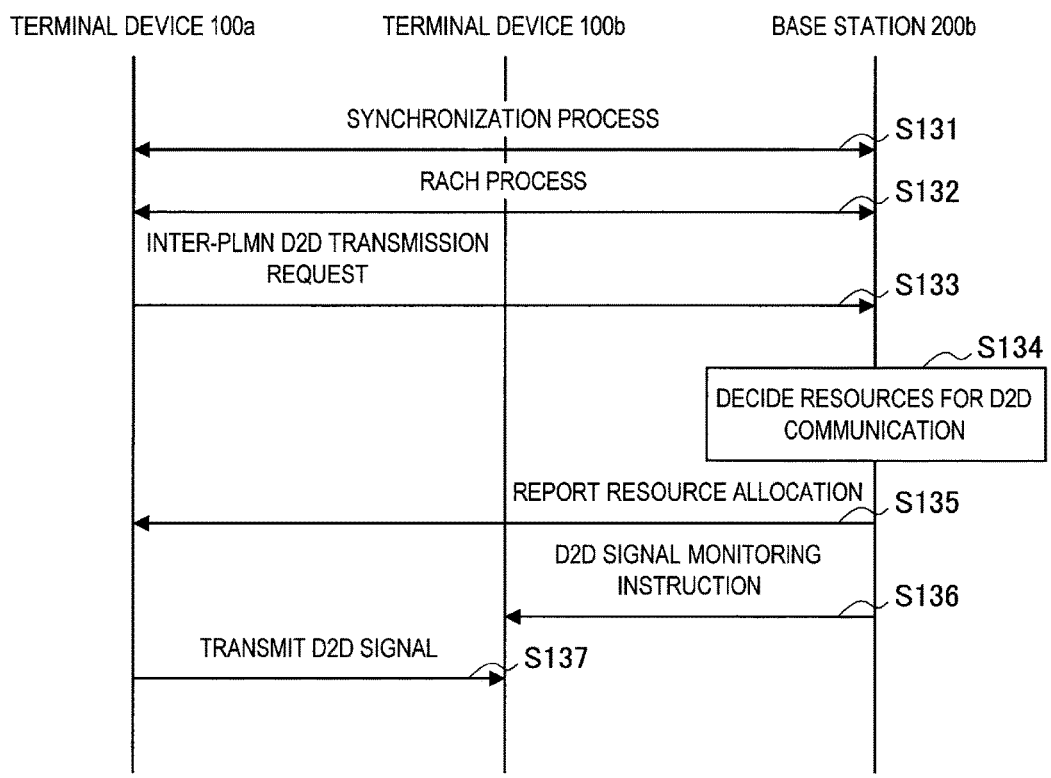

[Fig. 13]
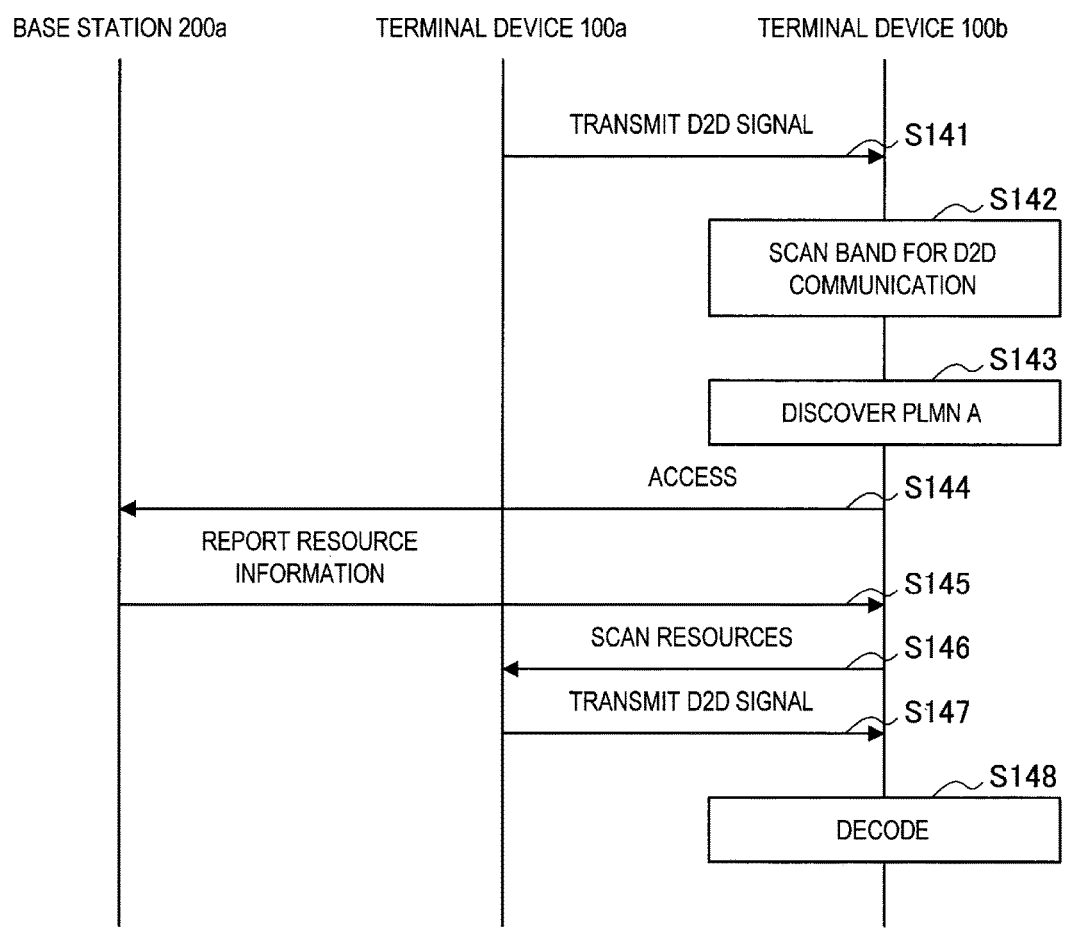

[Fig. 14]
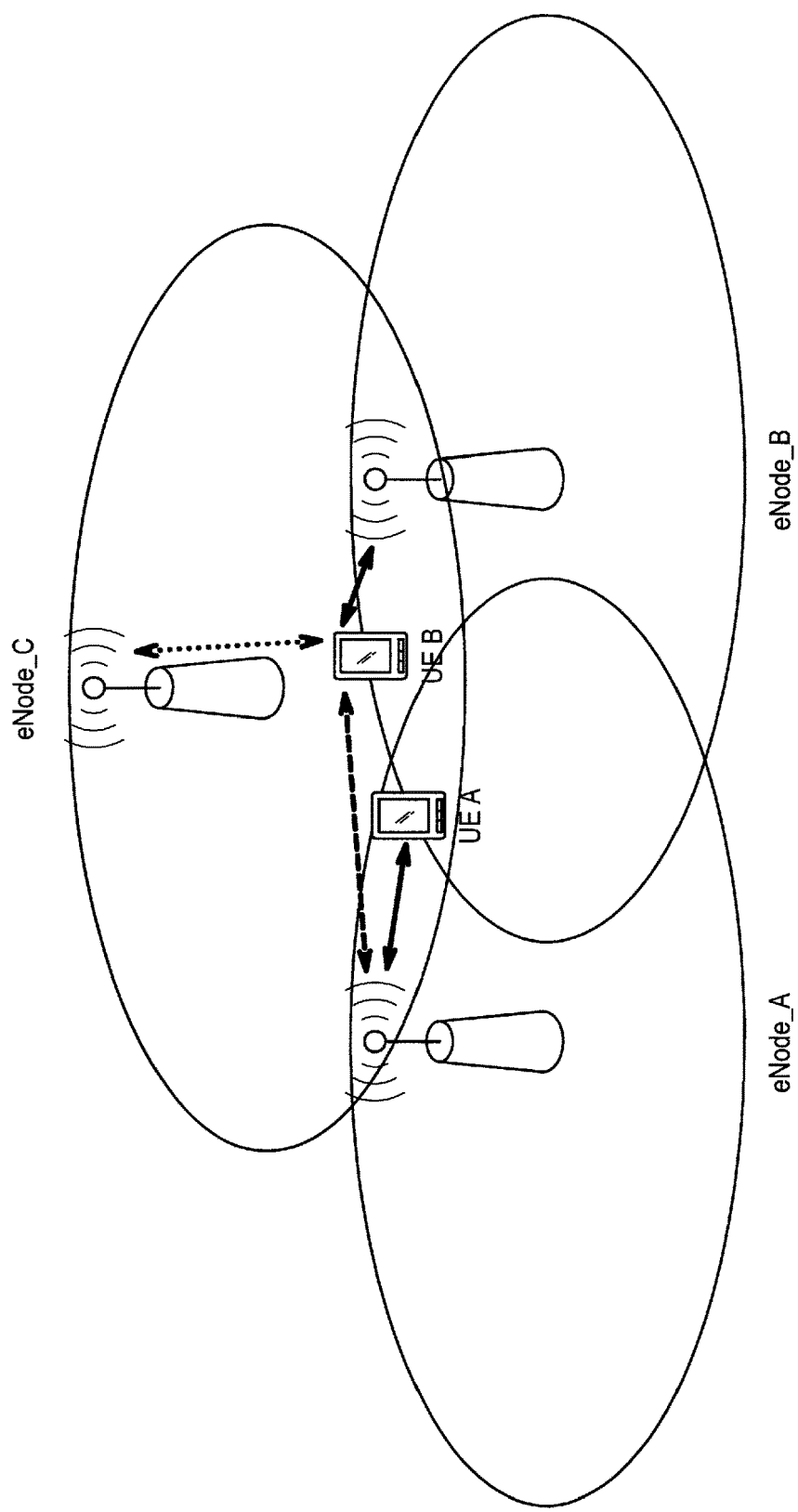

[Fig. 15]
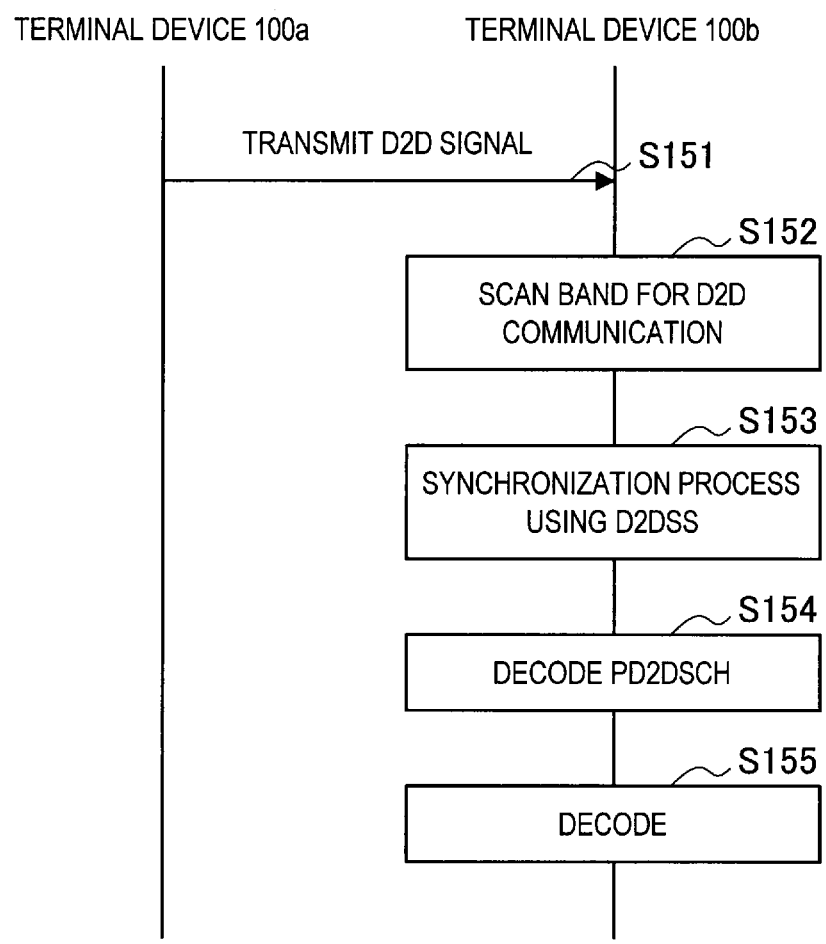

[Fig. 16]
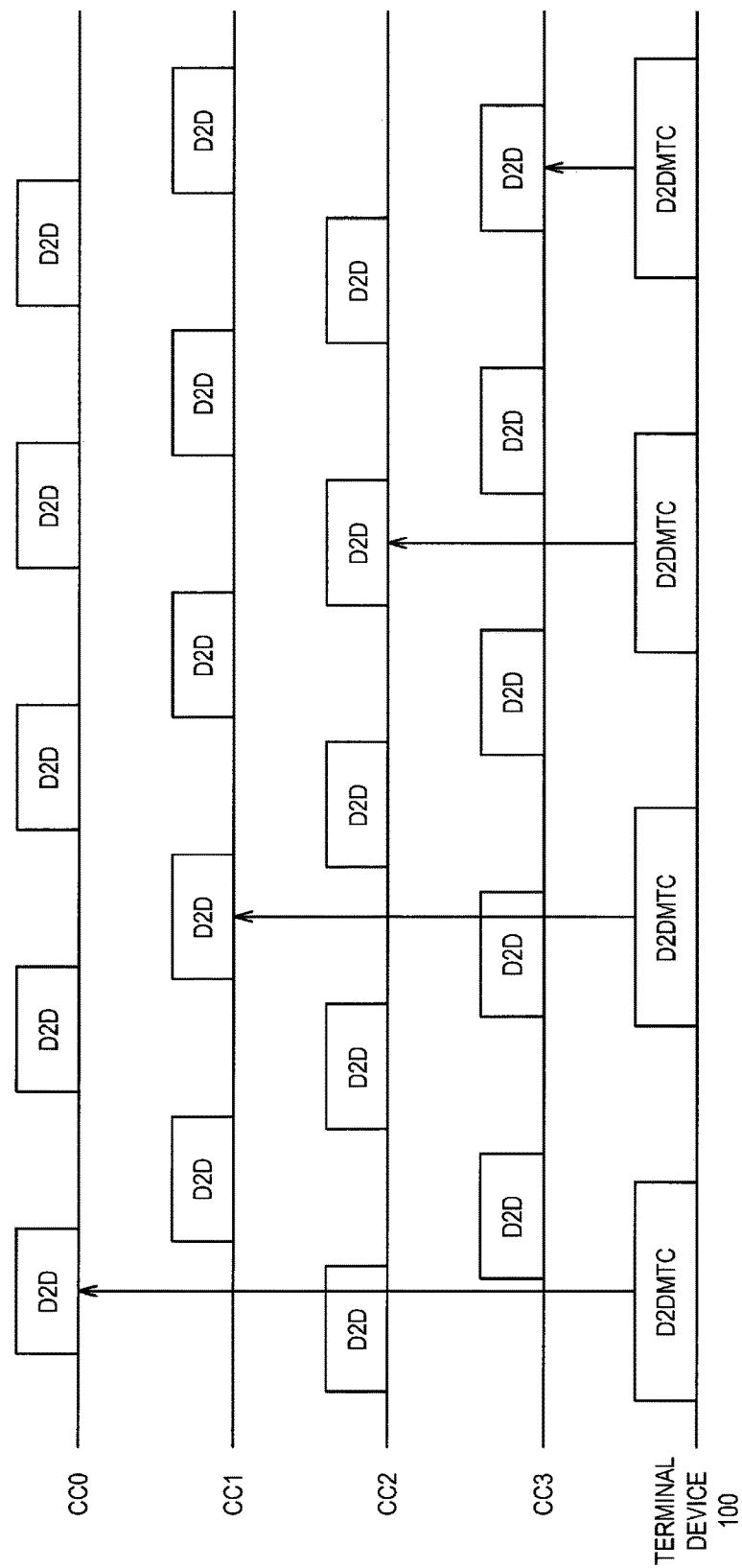

[Fig. 17]
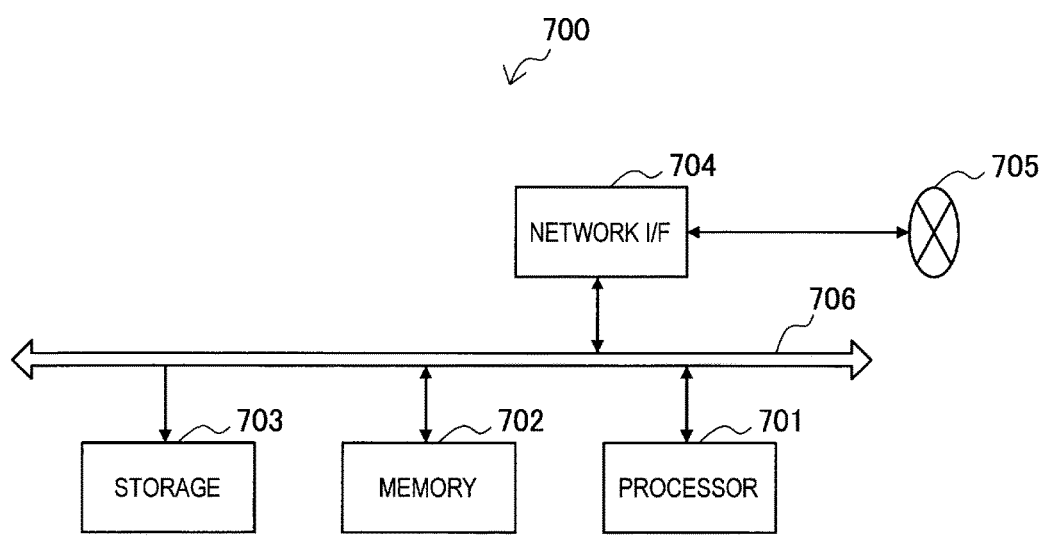

[Fig. 18]
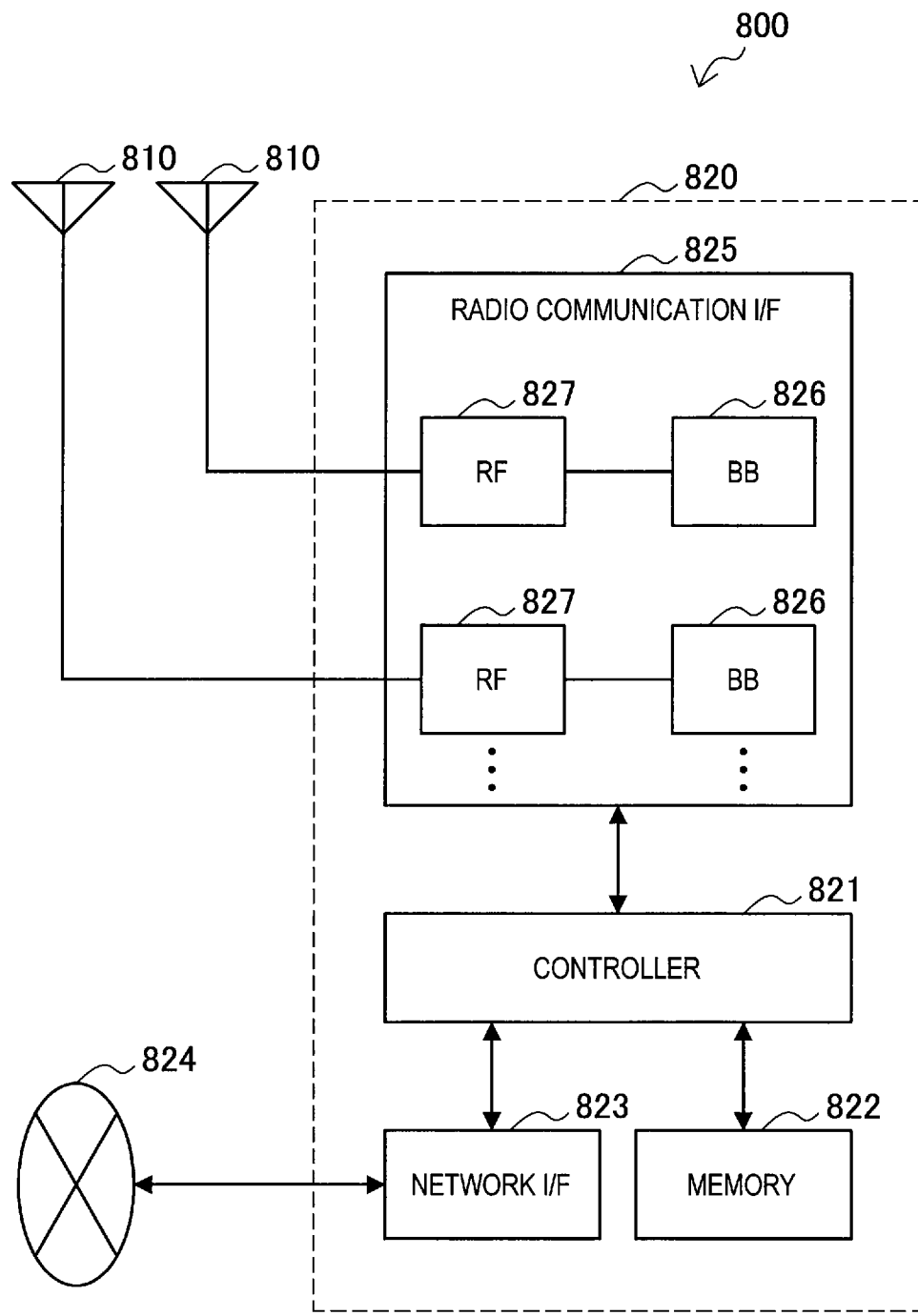

[Fig. 19]
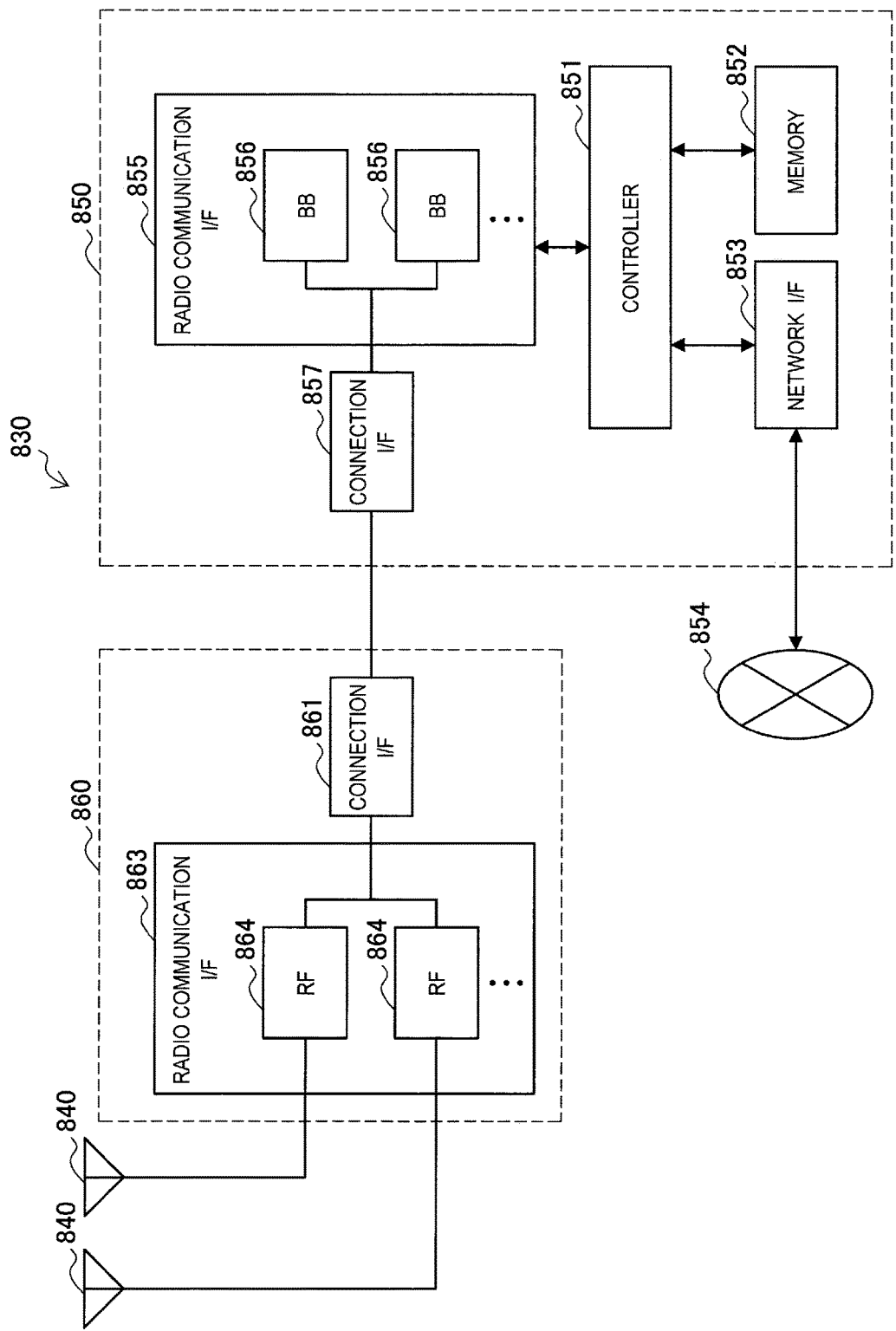

[Fig. 20]
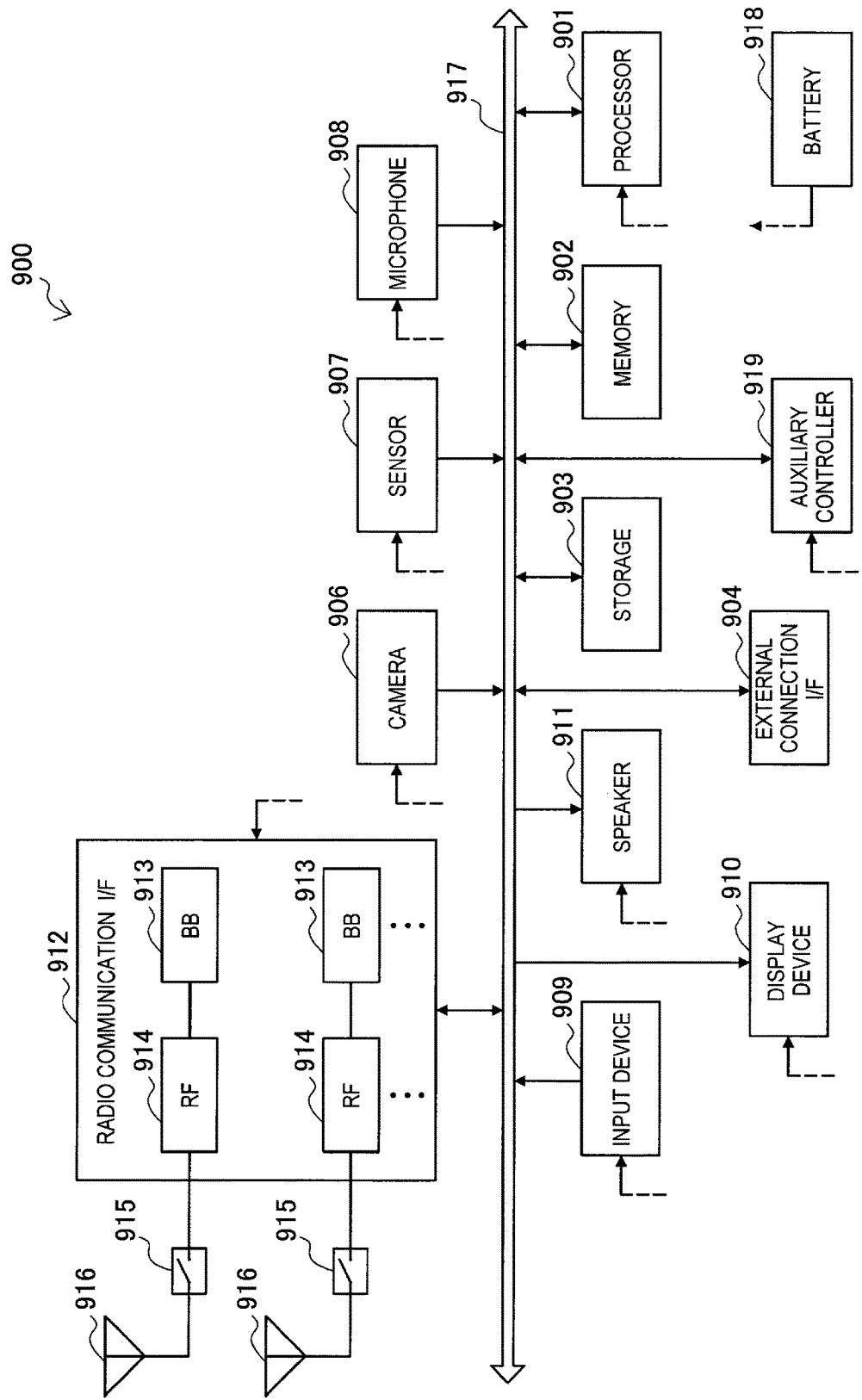

[Fig. 21]
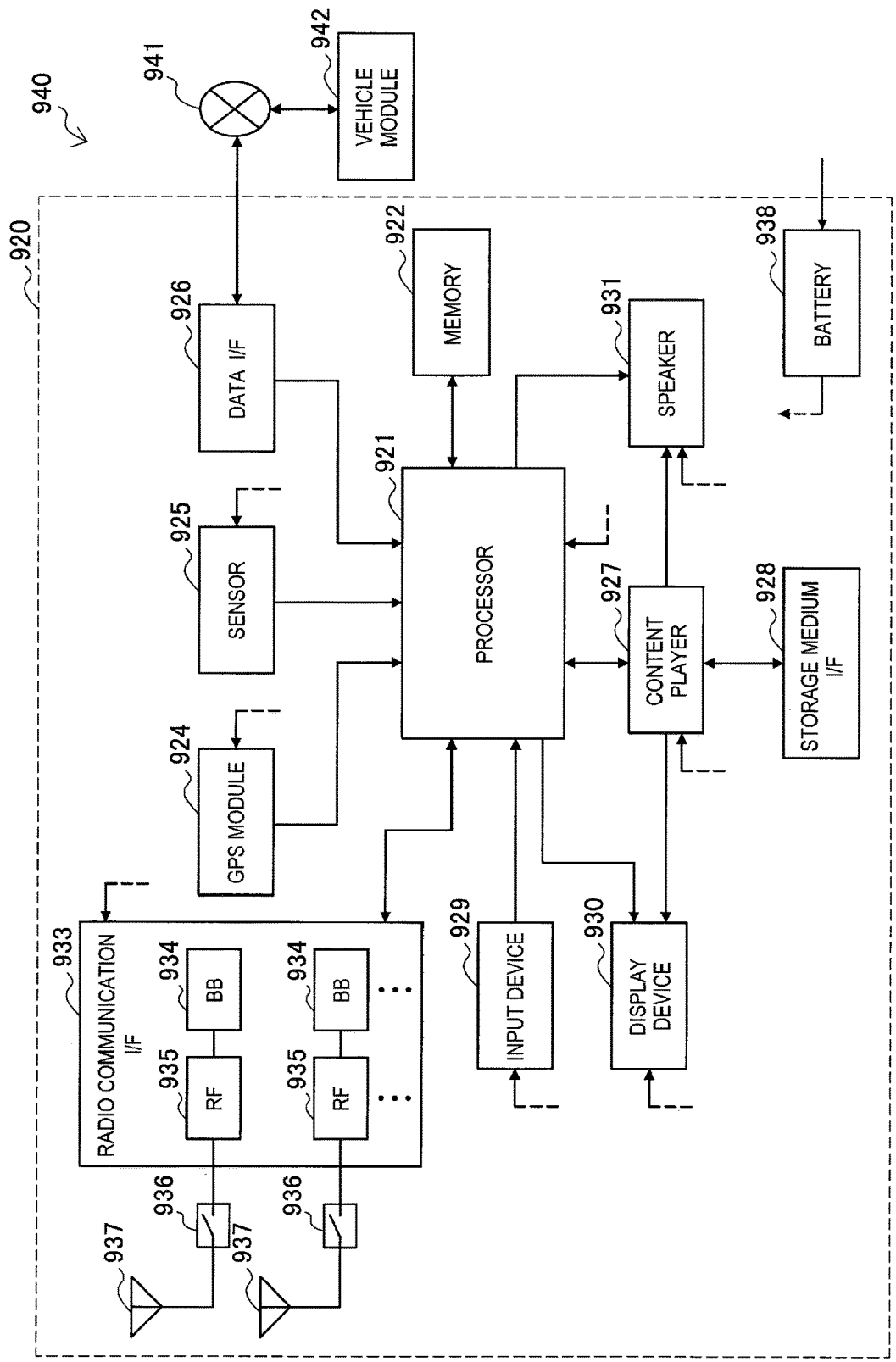

DEVICE AND METHOD IN A PUBLIC LAND MOBILE NETWORK INCLUDING DIRECT COMMUNICATIONS BETWEEN TERMINALS

CROSS REFERENCE TO RELATED APPLICATIONS

This application claims the benefit of Japanese Priority Patent Application JP 2015-080356 filed Apr. 9, 2015, the entire contents of which are incorporated herein by reference.

TECHNICAL FIELD

The present disclosure relates to a device and a method.

BACKGROUND ART

In the Long Term Evolution (LTE) platform, device-to-device (D2D) communication, in which terminal devices communication with each other directly without going through a base station, has been standardized in Release 12 (Rel-12) of the Third Generation Partnership Project (3GPP) (see Non-Patent Literature 1).

CITATION LIST

Non Patent Literature

NPL 1: 3GPP Technical Report, "TR 22.803 V12.1.0", March, 2013

SUMMARY

Technical Problem

Release 12 of the 3GPP standardized device-to-device communication between terminal devices belonging to one cellular system. In the future, the provision of a mechanism for conducting device-to-device communication between terminal devices belonging to different cellular systems is conceivable.

Accordingly, an embodiment of the present disclosure proposes a new and improved device and method enabling control of device-to-device communication by terminal devices belonging to different cellular systems.

Solution to Problem

According to an embodiment of the present disclosure, there is provided a device a device that acquires resource information indicating a radio resource for use in device-to-device (D2D) communication between a first terminal device belonging to a first public land mobile network (PLMN) and a second terminal device belonging to a second PLMN; and controls D2D communication between the first terminal device and the second terminal device based on the resource information.

According to an embodiment of the present disclosure, there is provided a method including acquiring resource information indicating a radio resource for use in device-to-device (D2D) communication between a first terminal device belonging to a first public land mobile network (PLMN) and a second terminal device belonging to a second PLMN; and controlling D2D communication between the first terminal device and the second terminal device based on the resource information.

Advantageous Effects of Invention

According to an embodiment of the present disclosure as described above, a new and improved device and method enabling control of device-to-device communication by terminal devices belonging to different cellular systems may be provided.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram illustrating a case in which there is a UE within the coverage range of an eNB, and a case in which there is a UE outside the coverage range.

FIG. 2 is an explanatory diagram illustrating a case in which UEs respectively belonging to the different MNOs Operator A and Operator B conduct D2D communication with each other.

FIG. 3 is an explanatory diagram illustrating the position of the PSS/SSS.

FIG. 4 is an explanatory diagram illustrating the structure of LTE resources.

FIG. 5 is an explanatory diagram illustrating a resource pool.

FIG. 6 is an explanatory diagram illustrating an example of a schematic configuration of a communication system 1 according to an embodiment of the present disclosure.

FIG. 7 is an explanatory diagram illustrating a configuration example of a terminal device 100 according to an embodiment of the present disclosure.

FIG. 8 is an explanatory diagram illustrating a configuration example of a base station 200 according to an embodiment of the present disclosure.

FIG. 9 is a flowchart illustrating an operation example of a communication system 1 according to an embodiment of the present disclosure.

FIG. 10 is a flowchart illustrating an operation example of a communication system 1 according to an embodiment of the present disclosure.

FIG. 11 is a flowchart illustrating an operation example of a communication system 1 according to an embodiment of the present disclosure.

FIG. 12 is a flowchart illustrating an operation example of a communication system 1 according to an embodiment of the present disclosure.

FIG. 13 is a flowchart illustrating an operation example of a communication system 1 according to an embodiment of the present disclosure.

FIG. 14 is an explanatory diagram illustrating an example of a case in which multiple base stations of a cellular system on the transmitting side are present within the range of a terminal device 100b.

FIG. 15 is a flowchart illustrating an operation example of a communication system 1 according to an embodiment of the present disclosure.

FIG. 16 is an explanatory diagram illustrating an example of D2DMTC used for inter-PLMN D2D communication.

FIG. 17 is a block diagram illustrating an example of a schematic configuration of a server 700 to which technology according to an embodiment of the present disclosure may be applied.

FIG. 18 is a block diagram illustrating a first example of a schematic configuration of an eNB.

FIG. 19 is a block diagram illustrating a second example of a schematic configuration of an eNB.

FIG. 20 is a block diagram illustrating an example of a schematic configuration of a smartphone.

FIG. 21 is a block diagram illustrating an example of a schematic configuration of a car navigation device.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, the description will proceed in the following order.

1. Embodiment of present disclosure
1.1. Background
1.2. Configuration example
1.3. Operation examples
1.3.1. First operation example
1.3.2. Second operation example
1.3.3. Third operation example
2. Application examples
3. Conclusion

1. EMBODIMENT OF PRESENT DISCLOSURE

1.1. Background

First, before describing an embodiment of the present disclosure in detail, the background of an embodiment of the present disclosure will be described.

In the LTE platform, device-to-device communication (D2D communication), in which terminal devices communicate with each other directly without going through a base station, has been standardized in Release 12 (Rel-12) of the 3GPP. In Rel-12, public uses cases and commercial use cases are defined as particular D2D use cases, but in Rel-12, a standard focusing on public use cases was examined first. Due to time constraints on standardization, the standardization for all use cases has not been completed by the time of Rel-12, and D2D communication in a limited scenario of being in a single-cell environment with one public land mobile network (PLMN) has been standardized.

In the future, the standardization of not only D2D communication in a one-PLMN (intra-PLMN), single-cell environment, but also D2D communication across different PLMNs (in an inter-PLMN/multi-carrier environment) will be conducted.

Use cases for D2D communication using the LTE platform are being discussed by groups such as the 3GPP SA1, and are described as TR 22.803. TR 22.803 only describes use cases, and does not disclose specific methods of realization. Representative use cases to be realized by 3GPP LTE from TR 22.803 are indicated hereinafter.

(Use Case: For Coverage)

Regarding the location where LTE terminal devices, or user equipment (UEs), communicate, the case of being inside the coverage range of an LTE base station, or evolved Node B (eNodeB; hereinafter also denoted eNB), and the case of being outside the coverage area should be considered. This is because the case of being outside the eNB coverage area is important for public safety applications. FIG. 1 is an explanatory diagram illustrating a case in which there is a UE within the coverage range of an eNB, and a case in which there is a UE outside the coverage range. Additionally, it is desirable also to account for partial coverage, which is communication between a UE inside the eNB coverage range and a UE outside the eNB coverage range.

(Use case: D2D Between Different Mobile Network Operators (MNOs))

It is desirable also to account for D2D communication conducted by UEs belonging to different MNOs. This is because in the case of public safety applications, valuable uses may be unavailable if a distinction is made between which MNO a UE belongs to. FIG. 2 is an explanatory diagram illustrating a case in which UEs respectively belonging to the different MNOs Operator A and Operator B conduct D2D communication with each other.

Considering the above two use cases, it is desirable to realize D2D communication on an LTE system.

Next, the flow for starting D2D communication on an LTE system will be described.

(Flow Up to the Start of D2D Communication)

Step 1: Synchronization
Step 2: Discovery (of other terminals)
Step 3: Connection Establishment (not required in the case of connectionless communication)
Step 4: D2D Communication Also, for D2D communication on an LTE system, mainly the following types of Discovery and Communication are prescribed.

(Discovery)

Type 1: A discovery procedure where resources for discovery signal transmission are allocated on a non UE specific basis Type 2: A discovery procedure where resources for discovery signal transmission are allocated on a per UE specific basis Type 2a: Resources are allocated for each specific transmission instance of discovery signal Type 2b: Resources are semi-persistently allocated for discovery signal transmission (Communication)

Mode 1: eNodeB or Rel-10 Relay node schedules the exact resources by a UE to transmit direct data and direct control information Mode 2: A UE on its own selects resources from resource pool to transmit Discovery is classified into non UE specific based discovery and UE specific based discovery, and UE specific based discovery is further classified into a method that allocates resources for every transmission, and a method that allocates resources semi-persistently. Communication is classified into Mode 1 communication, in which a manager such as an eNodeB allocates resources, and Mode 2 communication, in which a UE on its own selects resources from a resource pool. In the case of a UE on its own selecting resources from a resource pool in Mode 2 communication, collisions may occur, and thus Mode 2 communication is contention-based.

(Synchronization)

In the case of D2D communication between UEs inside the coverage range of one eNodeB, if the relevant UEs synchronize using a downlink signal from the eNodeB, the UEs may also be considered to be synchronized with each other to some degree. On the other hand, in the case of D2D communication between UEs outside the coverage range of an eNodeB, one of the UEs may need to provide a signal to use for synchronization.

(PSS/SSS)

The primary synchronization signal (PSS) and secondary synchronization signal (SSS) are synchronization signals used in wide area networks (WANs). The synchronization signal itself of D2D communication on an LTE system is created based on the PSS/SSS.

FIG. 3 is an explanatory diagram illustrating the position of the PSS/SSS. As illustrated in FIG. 3, the PSS/SSS is inserted into the #0 subframe and the #5 subframe among the 10 subframes from #0 to #9 in LTE. A UE acquires the timing for every subframe with the PSS. Also, by additionally using the SSS, a UE becomes able to determine where the #0 subframe is.

The PSS also enables a UE to determine a cell group from among three cell groups, according to three types of sequences. For the SSS, 168×2=336 sequences are used to enable the determination of 168 types of cells, and also to determine the #0 subframe. With the PSS and the SSS, 168×3=504 different cells may be distinguished.

In the case of D2D communication on an LTE system, when a UE transmits a synchronization signal, the signal may not necessarily use the PSS/SSS as described above. However, the UE transmits a signal having multiple sequences, although the signal is not limited to having the same 504 types as above.

(D2D Synchronization Signal)

A synchronization signal may be a signal originating from a base station, and in the case of being outside the range of a base station, a signal originating from a UE. Additionally, the synchronization signal may be relayed wirelessly in some cases. Consequently, although a synchronization signal, the signal may have various attributes.

UEs may need to use some kind of synchronization signal to synchronize. The following illustrates examples of the attributes of possible synchronization signals. Specifically, attributes refer to whether the source of synchronization is an eNodeB or a UE, and whether the synchronization signal was relayed wirelessly or produced originally. In the case of wirelessly relaying a synchronization signal, the accuracy of the center frequency may conceivably degrade. Consequently, it is desirable for the relay count (number of hops) to be small. Also, the higher priority of a synchronization signal originating from an eNodeB over a synchronization signal originating from a UE is because the accuracy of the oscillators installed on board UEs is low.

(Resources for D2D Use)

FIG. 4 is an explanatory diagram illustrating the structure of LTE resources. An LTE resource constitutes one radio frame made up of 10 subframes. Each radio frame is assigned a number called the super frame number from 0 to 1023. The super frame number is repeated.

In D2D communication, some of the resources in the uplink band of WAN communication are used. To specify the resources to use for D2D communication, an area called the resource pool is made available. FIG. 5 is an explanatory diagram illustrating a resource pool. In the resource pool illustrated in FIG. 5, the sign 21 indicates a D2D synchronization signal (D2DSS), the sign 22 indicates a physical D2D synchronization channel (PD2DSCH), the sign 23 indicates a scheduling assignment (SA), the sign 24 indicates D2D data, the sign 25 indicates a sounding reference signal (SRS), and the sign 26 indicates a discovery message.

Three types of resource pools are prescribed: a scheduling assignment (SA) resource pool, a data resource pool, and a discovery resource pool. In these resource pools, a maximum of up to four resource pools may be allocated at the same time. Resource pool designation is handled by being reported from the WAN via a system information block (SIB) in the in-coverage case, and by prescribing resource pool information in advance in the out-of-coverage case.

There are two methods of deciding the actual resources to be used by a UE terminal conducting D2D communication from among a resource pool: a method of a management node (an eNB or a relay UE) allocating resources to each UE and informing each UE which resources may be used in the form of a schedule assignment, and a method of the UE on its own selecting and using resources from a predetermined resource pool. The former is a non-contention-based method, since collisions do not occur, whereas the latter is a contention-based method, since collisions may occur when the same resource is used at the same time.

When considering the case of performing inter-PLMN D2D communication, first there is the problem of deciding which PLMN carrier to use to conduct communication. At this point, the following two cases will be considered.

(1) The transmitting terminal transmits a D2D signal using a carrier other than the serving cell (such as a non-serving carrier or a secondary carrier)

(2) The transmitting terminal transmits a D2D signal using only the carrier of the serving cell.

In the above case (1), the receiving terminal receives a D2D signal from the transmitting terminal on its own serving carrier. In this case, a mechanism of transmitting D2D signals on different carriers may be needed. Generally, terminals on different PLMNs conducting communication on their own carriers is not desirable. The transmitting terminal may need to transmit a D2D signal so as to not affect existing terminals belonging to the carrier of the destination PLMN.

In the above case (2), the receiving terminal receives a D2D signal by looking at the serving carrier of the transmitting terminal. In this case, the receiving side searches for a signal sent by the transmitting side, and may need to decode the signal. The problem to be solved is how to make the terminal on the receiving side efficiently receive a signal from a transmitting side residing on a different PLMN.

Three possible solutions are given below, for example.
(Technique 1) A dedicated band for inter-PLMN use is prepared, and inter-PLMN communication shares the dedicated band among multiple PLMNs.
(Technique 2) Some kind of information is exchanged between PLMNs and provided to the transmitting terminal and the receiving terminal as assistance information. Each terminal passively obtains assistance information.
(Technique 3) Information is not exchanged between PLMNs, and each terminal actively obtains assistance information.

If Technique 1 is used, a dedicated band in which to conduct inter-PLMN D2D communication is provided, and thus frequencies for conducting inter-PLMN may be uniquely specified, enabling D2D communication to be established easily. Also, if Technique 1 is used, issues such as affecting existing terminals in the above case (1) may be avoided, and the problem of searching for a D2D signal in the above case (2) does not arise. However, a new frequency band for inter-PLMN use must be prepared, and realization is considered to be difficult. A method of using an unlicensed band is also conceivable, but the problem of coexistence with Wi-Fi terminals and other devices may need to be addressed.

If Technique 2 is used, an exchange of information between PLMNs becomes necessary. However, when considering the perspective of operators, the exchange of information between PLMNs is generally undesirable. Also, in the email discussion of (76b-12) by RAN1 (summarized in R1-142579), a conclusion to "not mandate" coordination between PLMNs was reached. For this reason, when performing coordination between PLMNs, it is desirable to keep the exchange of data to a minimum.

Technique 3 is a method of terminals actively obtaining relevant data on their own, and generally does not require an exchange of information between PLMNs.

Consequently, when taking Techniques 1 to 3 all together, D2D communication using a common frequency between PLMNs without providing new frequencies dedicated to D2D communication is desirable, and there is demand for a mechanism enabling terminals to actively obtain data relevant to inter-PLMN D2D communication while minimizing exchanges between PLMNs.

To establish such inter-PLMN D2D communication using a common frequency between PLMNs without providing new frequencies dedicated to D2D communication, issues like the following may need to be addressed.

(Issue 1) Method of Obtaining Information Relevant to Conducting Inter-PLMN D2D Communication In inter-PLMN D2D communication, the receiving terminal and the transmitting terminal may need to obtain information related to D2D communication. For example, the D2D communication of Rel-12 prescribes allocating a resource pool and conducting communication within that resource pool. Configuration information about the allocated resource pool is reported from the base station to a terminal via the SIB if the terminal is in coverage. If the terminal is out of coverage, reception is conducted based on preconfigured information. However, in the case of inter-PLMN communication, each terminal does not have information about the resource pool in the PLMN to which the other terminal belongs.

Before conducting inter-PLMN D2D communication, each terminal may need to obtain not only resource pool information but also information for conducting inter-PLMN D2D communication. Thus, there is demand for a mechanism enabling terminals to exchange information for conducting inter-PLMN D2D communication.

(Issue 2-1) Synchronization with Carrier on which D2D Communication is Transmitted To conduct D2D communication between a transmitting terminal and a receiving terminal, first the transmitting terminal and the receiving terminal may need to synchronize. If the transmitting terminal conducting D2D communication transmits a D2D signal on the carrier on the receiving terminal side, no particular issues occur, because it is sufficient for the receiving terminal to look at the uplink band in its own cell. However, when considering a case in which the transmitting terminal conducting D2D communication transmits a D2D signal only in the uplink band of its own cell, the receiving terminal may need to search for the band of the carrier being used by the transmitting terminal.

When considering a multi-PLMN environment, multiple frequency carriers to be scanned exist, and thus such a carrier scan for the carrier being used by the terminal on the other side is burdensome for the receiving terminal. For example, assuming that each of three PLMNs is using four component carriers (CCs), the receiving terminal may need to scan 3×4−1=11 CCs after subtracting the frequency the receiving terminal itself is using. Since the D2D synchronization signal is transmitted on a 40 ms interval in the case of FDD, completing a scan of all CCs takes at minimum 40×11=440 ms. For this reason, there is demand for a method enabling the receiving terminal to efficiently search for frequencies to scan for finding the band of the carrier being used by the transmitting terminal.

(Issue 2-2) Efficient Carrier Scanning

To receiving a D2D signal in an inter-PLMN environment, the receiving terminal performs a procedure of looking for the carrier on the transmitting side, checking the resource pool, and searching for data addressed to the receiving terminal itself from the resource pool. However, this procedure takes time. If the carrier being measured by the receiving terminal is not the desired carrier, it may take time for the receiving terminal to recognize the mistake. Consequently, there is demand for a mechanism enabling the receiving terminal to efficiently scan a carrier.

(Issue 3) Method of Transmitting ACK/NACK/Reply Message

In inter-PLMN D2D communication, the transmission of an ACK/NACK after receiving a signal and the transmission of a reply message is anticipated. With inter-PLMN D2D communication, the setup of a communication environment is expected to be time-consuming, and if one attempts to apply a procedure similar to signal transmission to the transmission of an ACK/NACK/reply message, it is anticipated that the procedure will become extremely complicated. For this reason, there is demand for a mechanism enabling efficient replies in inter-PLMN D2D communication.

Accordingly, in light of the background discussed above, the authors of the present disclosure investigated technologies enabling effective inter-PLMN D2D communication. As a result, the authors of the present disclosure conceived of a technology that addresses the issues discussed above and enables effective inter-PLMN D2D communication.

The above thus describes the background of an embodiment of the present disclosure. Next, an embodiment of the present disclosure will be described in detail.

1.2. Configuration Example

First, a configuration example of a communication system according to an embodiment of the present disclosure will be described. FIG. 6 is an explanatory diagram illustrating an example of a schematic configuration of a communication system 1 according to an embodiment of the present disclosure. As illustrated in FIG. 6, the communication system 1 includes base stations 200*a* and 200*b*, terminal devices 100*a* and 100*b*, and control entities 300*a* and 300*b*. The communication system 1 is a system conforming to LTE, LTE-Advanced, or a compliant communication standard, for example.

The base stations 200*a* and 200*b* wirelessly communicate with terminal devices including the terminal devices 100*a* and 100*b*, respectively. In addition, each of the terminal devices 100*a* and 100*b* communicates with the base station 200*a* or the base station 200*b*, respectively. Note that the base stations 200*a* and 200*b* belong to respectively different cellular systems, in which the terminal device 100*a* wirelessly communicates using network resources used by the cellular system to which the base station 200*a* belongs, and the terminal device 100*b* wirelessly communicates using network resources used by the cellular system to which the base station 200*b* belongs. Note that in the following description, the cellular system to which the base station 200*a* belongs will also be called the "PLMN A", while the cellular system to which the base station 200*b* belongs will also be called the "PLMN B".

The control entities 300*a* and 300*b* perform control according to each embodiment of the present disclosure. The control entities 300*a* and 300*b* are existing or new core network nodes, for example. Alternatively, the control entities 300*a* and 300*b* may be base stations. As an example, in the case in which the base stations 200*a* and 200*b* are small base stations, the control entities 300*a* and 300*b* may be macro base stations.

In the following description, the terminal device on the transmitting side attempting to transmit information by inter-PLMN D2D communication will be described as the terminal device 100*a*, while the terminal device on the receiving side attempting to receive information from the terminal device 100*a* by inter-PLMN D2D communication will be described as the terminal device 100*b*.

Next, a configuration example of the terminal device 100 according to an embodiment of the present disclosure will be described. FIG. 7 is an explanatory diagram illustrating a configuration example of a terminal device 100 according to an embodiment of the present disclosure. Hereinafter, FIG. 7 will be used to describe a configuration example of the terminal device 100 according to an embodiment of the present disclosure.

The terminal device 100 illustrated in FIG. 7 is a terminal device configured to execute inter-PLMN D2D communication with another terminal device 100. As illustrated in FIG. 7, the terminal device 100 according to an embodiment of the present disclosure includes an antenna unit 110, a radio communication unit 120, a storage unit 130, and a processing unit 140. In the present embodiment, both the terminal device 100*a* on the transmitting side and the terminal device 100*b* on the receiving side are described as having the configuration of the terminal device 100 as illustrated in FIG. 7.

(Antenna Unit 110)

The antenna unit 110 emits a signal output by the radio communication unit 120 into space as a radio wave. Additionally, the antenna unit 110 converts a radio wave from space into a signal, and outputs the signal to the radio communication unit 120.

(Radio Communication Unit 120)

The radio communication unit 120 transmits and receives signals. For example, the radio communication unit 120 receives a downlink signal from a base station, and transmits an uplink signal to a base station.

(Storage Unit 130)

The storage unit 130 temporarily or permanently stores programs and data for the operation of the terminal device 100.

(Processing Unit 140)

The processing unit 140 provides various functions of the terminal device 100. The processing unit 140 includes an information acquisition unit 141 and a control unit 143. Note that the processing unit 140 may additionally include other structural elements besides the above structural elements. In other words, the processing unit 140 may also perform operations besides the operations of the above structural elements.

(Information Acquisition Unit 141)

The information acquisition unit 141 acquires various information from signals obtained from radio waves received by the antenna unit 110. In the present embodiment, the information acquisition unit 141 is configured to acquire information for inter-PLMN D2D communication with another terminal device 100.

In particular, the information acquisition unit 141 acquires resource information indicating radio resources to be used in inter-PLMN D2D communication with another terminal device 100. By having the information acquisition unit 141 acquire resource information, the terminal device 100 becomes able to efficiently conduct inter-PLMN D2D communication with another terminal device 100.

(Control Unit 143)

The control unit 143 controls the operation of the terminal device 100. In particular, in the present embodiment, the control unit 143 uses information acquired by the information acquisition unit 141, particularly resource information indicating radio resources to be used in inter-PLMN D2D communication, to control inter-PLMN D2D communication with another terminal device 100.

By including the configuration illustrated in FIG. 7, the terminal device 100 is able to acquire resource information indicating radio resources to be used in inter-PLMN D2D communication from a base station or another terminal device 100, and execute inter-PLMN D2D communication with another terminal device 100.

The foregoing thus describes a functional configuration example of a terminal device 100 according to an embodiment of the present disclosure. Next, a functional configuration example of a base station 200 according to an embodiment of the present disclosure will be described.

FIG. 8 is a block diagram illustrating a functional configuration example of a base station 200 according to an embodiment of the present disclosure. As illustrated in FIG. 8, the base station 200 according to an embodiment of the present disclosure includes an antenna unit 210, a radio communication unit 220, a network communication unit 230, a storage unit 240, and a processing unit 250.

(Antenna Unit 210)

The antenna unit 210 emits a signal output by the radio communication unit 220 into space as a radio wave. Additionally, the antenna unit 210 converts a radio wave from space into a signal, and outputs the signal to the radio communication unit 220.

(Radio Communication Unit 220)

The radio communication unit 220 transmits and receives signals. For example, the radio communication unit 220 transmits a downlink signal to a terminal device, and receives an uplink signal from a terminal device.

(Network Communication Unit 230)

The network communication unit 230 transmits and receives information. For example, the network communication unit 230 transmits information to another node, and receives information from another node. For example, the above other node includes a core network and other base stations. As an example, the above other node, includes the control entities 300.

(Storage Unit 240)

The storage unit 240 temporarily or permanently stores programs and data for the operation of the base station 200.

(Processing Unit 250)

The processing unit 250 provides various functions of the base station 200. The processing unit 250 includes an information acquisition unit 251 and a control unit 253. Note that the processing unit 250 may additionally include other structural elements besides the above structural elements. In other words, the processing unit 250 may also perform operations besides the operations of the above structural elements.

(Information Acquisition Unit 251)

The information acquisition unit 251 acquires information. In the present embodiment, the information acquisition unit 251 is configured to acquire information for inter-PLMN D2D communication with a terminal device 100 belonging to a different PLMN.

(Control Unit 253)

The control unit 253 controls operation of the base station 200. In the present embodiment, the control unit 253 operates to provide information for inter-PLMN D2D communication to a terminal device 100.

The above thus describes a functional configuration example of a base station 200 according to an embodiment of the present disclosure. Next, operation examples of a communication system 1 according to an embodiment of the present disclosure will be described.

1.3. Operation Examples

1.3.1. First Operation Example

First, an operation example of the communication system 1 for exchanging information for conducting inter-PLMN D2D communication between the terminal devices 100*a* and 100*b* given as the above Issue 1 will be described. The following three techniques are conceivable for exchanging information for conducting inter-PLMN D2D communication between the terminal devices 100*a* and 100*b*.

(Technique 1-A) Obtaining information via the base station of the local cell (Technique 1-B) Obtaining information via the base station of the peer's cell (Technique 1-C) Obtaining information directly from the peer (Technique 1-A) Obtaining information via the base station of the local cell First, technique 1-A will be described. Obtaining information via the base station of the local cell means that each of the terminal devices 100*a* and 100*b* obtains information from the base stations 200*a* and 200*b* of the local cell, respectively, as indicated by the solid lines in FIG. 6. Obtaining information for conducting inter-PLMN D2D communication via the base station of the local cell entails that the information for conducting inter-PLMN D2D communication is exchanged between PLMNs, or in other words, between the base stations 200*a* and 200*b*.

First, in technique 1-A, an operation example in which the terminal device 100*a* on the transmitting side transmits a D2D signal on the carrier of the terminal device 100*b* on the receiving side will be illustrated.

FIG. 9 is a flowchart illustrating an operation example of a communication system 1 according to an embodiment of the present disclosure. The flowchart illustrated in FIG. 9 illustrates an operation example for the case of obtaining information for conducting inter-PLMN D2D communication via the base station of the local cell. Hereinafter, FIG. 9 will be used to describe an operation example of the communication system 1 according to an embodiment of the present disclosure.

In order for the terminal device 100*a* to transmit a D2D signal on the carrier of the terminal device 100*b* on the receiving side, first the terminal device 100*a* issues an inter-PLMN D2D transmission request to the base station 200*a* of the local cell (step S101). The transmission request process of step S101 is executed by the control unit 143, for example. The request information transmitted by the terminal device 100*a* to the base station 200*a* in step S101 may include information such as transmission target PLMN information (information prescribing a specific PLMN ID, all PLMNS, or all but specific PLMNs, for example), the terminal ID of the peer, the type of D2D signal to transmit (Discovery, Communication), the size of the data to transmit, a new data indicator (NDI), location information about the terminal device 100*a*, and the maximum number of retransmissions. Also, uplink control information (UCI) may be used in the transmission request process of step S101.

The base station 200*b* reports the current status of D2D communication to the base station 200*a* (step S102). The reporting process of step S102 is executed by the control unit 253, for example. Note that the D2D communication status may be reported at arbitrary timings.

The base station 200*a* acquires the inter-PLMN D2D transmission request from the terminal device 100*a*, and uses information included in the request information transmitted from the terminal device 100*a* to compute resources to allocate to the terminal device 100*a* for inter-PLMN D2D communication, the transmission band of the D2D signal, the transmission timing of the D2D signal, and the transmit power. The computing process of step S103 is executed by the control unit 253, for example.

The base station 200*a*, after computing the resources to allocate to the terminal device 100*a* for inter-PLMN D2D communication, the transmission band of the D2D signal, the transmission timing of the D2D signal, and the transmit power in the above step S103, transmits the transmission timing of the D2D signal, the transmission band, transmission resource information, and transmit power information to the terminal device 100*a* as a scheduling grant (step S104). The transmitting process of step S104 is executed by the control unit 253, for example. The information sent from the base station 200*a* to the terminal device 100*a* as a scheduling grant may include, for example, a grant from the base station 200*b* of the peer, band information, synchronization signal timing information, resource pool information (for example, information expressing types, timings, and the like as a bit map), and transmit power information. In addition, the transmission timing information sent from the base station 200*a* to the terminal device 100*a* may be an offset value from the synchronization of the local cell. In addition, the base station 200*a* transmits the scheduling grant to the terminal device 100*a* while also providing information about the scheduling result to the base station 200*b* (step S105). The process of step S105 is executed by the control unit 253, for example.

The base station 200*b* instructs the terminal device 100*b* to monitor for a D2D signal, on the basis of the information about the scheduling result provided from the base station 200*a* (step S106). The process of step S106 is executed by the control unit 253, for example. Subsequently, the terminal device 100*a* transmits a D2D signal to the terminal device 100*b* on the basis of the allocated resources, band, and timing (step S107). The process of step S107 is executed by the control unit 253, for example.

If the terminal device 100*b* is unable to receive the D2D signal, or if the terminal device 100*a* uses the wrong resources and exerts unwanted interference on the terminal device 100*b*, the base station 200*b* may transmit to the terminal device 100*a* a command to stop transmission of the D2D signal. The command to stop transmission of the D2D signal may be transmitted directly from the base station 200*b* to the terminal device 100*a*, or forwarded from the base station 200*b* to the base station 200*a* and transmitted from the base station 200*a* to the terminal device 100*a*.

The communication system 1 according to an embodiment of the present disclosure, by executing the series of operations illustrated in FIG. 9, is able to provide information for conducting inter-PLMN D2D communication to the terminal devices 100a and 100b.

In the flowchart illustrated in FIG. 9, the base station 200a of the cellular system to which the terminal device 100a on the transmitting side belongs computes the transmission timing, transmission band, transmission resource information, and transmit power of the D2D signal, but the present disclosure is not limited to such an example. The base station 200b of the cellular system to which the terminal device 100b on the receiving side belongs may also compute the transmission timing, transmission band, transmission resource information, and transmit power of the D2D signal.

FIG. 10 is a flowchart illustrating an operation example of a communication system 1 according to an embodiment of the present disclosure. The flowchart illustrated in FIG. 10 illustrates an operation example when obtaining information for conducting inter-PLMN D2D communication via the base station of the local cell, and illustrates an operation example for the case in which the base station 200b of the cellular system to which the terminal device 100b on the receiving side belongs computes the transmission timing, transmission band, transmission resource information, and transmit power of the D2D signal.

In order for the terminal device 100a to transmit a D2D signal on the carrier of the terminal device 100b on the receiving side, first the terminal device 100a issues an inter-PLMN D2D transmission request to the base station 200a of the local cell (step S111). The transmission request process of step S111 is executed by the control unit 143, for example. Also, the base station 200b reports the current status of D2D communication to the base station 200a (step S112). The process of step S112 is executed by the control unit 253, for example.

The base station 200a acquires the inter-PLMN D2D transmission request from the terminal device 100a, and forwards the acquired transmission request to the base station 200b (step S113). The process of step S113 is executed by the control unit 253, for example. The base station 200b acquires the inter-PLMN D2D transmission request from the base station 200a, and computes resources to allocate to the terminal device 100a for inter-PLMN D2D communication, the transmission band of the D2D signal, the transmission timing of the D2D signal, and the transmit power (step S114). The process of step S114 is executed by the control unit 253, for example.

The base station 200b, after computing the resources to allocate to the terminal device 100a for inter-PLMN D2D communication, the transmission band of the D2D signal, the transmission timing of the D2D signal, and the transmit power in step S114, reports the results of the calculations to the base station 200a (step S115). The process of step S115 is executed by the control unit 253, for example. The base station 200a transmits the transmission timing of the D2D signal, the transmission band, the transmission resource information, and the transmit power information to the terminal device 100a as a scheduling grant (step S116). The process of step S116 is executed by the control unit 253, for example. The base station 200b instructs the terminal device 100b to monitor for a D2D signal, on the basis of the calculation results of step S114 (step S117). The process of step S117 is executed by the control unit 253, for example. Subsequently, the terminal device 100a transmits a D2D signal to the terminal device 100b on the basis of the allocated resources, band, and timing (step S118). The process of step S118 is executed by the control unit 143, for example.

The communication system 1 according to an embodiment of the present disclosure, by executing the series of operations illustrated in FIG. 10, is able to provide information for conducting inter-PLMN D2D communication to the terminal devices 100a and 100b.

Next, in technique 1-A, an operation example in which the terminal device 100a on the transmitting side transmits a D2D signal on the carrier of the terminal device 100a on the transmitting side will be illustrated. When the terminal device 100a on the transmitting side transmits a D2D signal on the carrier of the terminal device 100a on the transmitting side, the terminal device 100b on the receiving side may need to look at the D2D communication band of the terminal device 100a, and for this reason acquires information about the D2D communication band of the terminal device 100a.

FIG. 11 is a flowchart illustrating an operation example of a communication system 1 according to an embodiment of the present disclosure. The flowchart illustrated in FIG. 11 illustrates an operation example for the case of obtaining information for conducting inter-PLMN D2D communication via the base station of the local cell. Hereinafter, FIG. 11 will be used to describe an operation example of the communication system 1 according to an embodiment of the present disclosure.

In order for the terminal device 100a to transmit a D2D signal on the carrier of its own cellular system, first the terminal device 100a issues an inter-PLMN D2D transmission request to the base station 200a of the local cell (step S121). The process of step S121 is executed by the control unit 143, for example. The base station 200a receives the request from the terminal device 100a, and decides the resources to be used for D2D communication (step S122). The process of step S122 is executed by the control unit 253, for example. Subsequently, the base station 200a reports information about the resources to be used for D2D communication decided in step S122 to the base station 200b (step S123), and also reports to the terminal device 100a that resources to be used for D2D communication have been allocated (step S124). The processes of steps S123 and S124 are executed by the control unit 253, for example.

The information sent from the base station 200a to the base station 200b in the above step S123 may include, for example, band information about a band to be used for D2D communication in the carrier of the terminal device 100a on the transmitting side, synchronization signal timing information, resource pool information (for example, information expressing types, timings, and the like as a bit map), and transmit power information.

The base station 200b instructs the terminal device 100b to monitor for a D2D signal, on the basis of the information about the resources to be used for D2D communication provided from the base station 200a (step S125). The process of step S125 is executed by the control unit 253, for example. Subsequently, the terminal device 100a transmits a D2D signal to the terminal device 100b on the basis of the allocated resources, band, timing, and transmit power from the base station 200a (step S126). The process of step S126 is executed by the control unit 253, for example.

The communication system 1 according to an embodiment of the present disclosure, by executing the series of operations illustrated in FIG. 11, is able to provide information for conducting inter-PLMN D2D communication to the terminal devices 100a and 100b.

(Technique 1-B) Obtaining Information Via the Base Station of the Peer'S Cell

Next, technique 1-B will be described. Obtaining information via the base station of the peer's cell means that the terminal device 100a obtains information from the base station 200b of its peer's cell while the terminal device 100b obtains information from the base station 200a of its peer's cell, as indicated by the dotted lines in FIG. 6. First, in technique 1-B, an operation example in which the terminal device 100a on the transmitting side transmits a D2D signal on the carrier of the terminal device 100b on the receiving side will be illustrated. FIG. 12 is a flowchart illustrating an operation example of a communication system 1 according to an embodiment of the present disclosure.

In order for the terminal device 100a on the transmitting side to be able to transmit a D2D signal in the band on the base station 200b, the terminal device 100a attempts to access the base station 200b. Specifically, the terminal device 100a receives a synchronization signal transmitted from the base station 200b, and executes a process of synchronizing with the base station 200b (step S131). The process of step S131 is executed by the control unit 143, for example.

Next, the terminal device 100a performs random access and attempts to connect, but normally the terminal of another PLMN is refused attachment. For this reason, inter-PLMN D2D communication would require using UE terminals having multiple SIM cards, but in an environment in which multiple PLMNs exist, this is not realistic. To prevent being refused attachment, the terminal device 100a reports an inter-PLMN D2D transmission indicator to the base station 200b. This information is performed during the RRC connection setup or during the authentication request. In FIG. 12, this process is illustrated as a RACH process (step S132). The process of step S132 is executed by the control unit 143, for example. Coordination between PLMNs may also be conducted in advance, and light attachment enabling inter-PLMN D2D communication even without the relevant terminal attaching may also be executed.

After attaching to the base station 200b, the terminal device 100a issues an inter-PLMN D2D transmission request to the base station 200b (step S133). The process of step S133 is executed by the control unit 143, for example. The base station 200b acquires the inter-PLMN D2D transmission request from the terminal device 100a, and decides resources to be used for D2D communication (step S134). The process of step S134 is executed by the control unit 253, for example. The base station 200b, after deciding the resources to be used for D2D communication in step S134, reports the allocation of resources to be used for D2D communication to the terminal device 100a (step S135). The process of step S135 is executed by the control unit 253, for example. The information reported in step S135 may include, for example, a grant from the base station 200b of the peer, band information, synchronization signal timing information, resource pool information (for example, information expressing types, timings, and the like as a bit map), and transmit power information.

Subsequently, the base station 200b instructs the terminal device 100b to monitor for a D2D signal, on the basis of the information about the resources to be used for D2D communication decided in step S134 (step S136). The process of step S136 is executed by the control unit 253, for example. Subsequently, the terminal device 100a transmits a D2D signal to the terminal device 100b on the basis of the allocated resources, band, and timing from the base station 200b (step S137). The process of step S137 is executed by the control unit 143, for example.

Note that in the above operation example, the terminal device 100a issues an inter-PLMN D2D transmission request to the base station 200b, and receives an allocation of resources to be used for D2D communication from the base station 200b, but the present disclosure is not limited to such an example. The terminal device 100a may also autonomously select resources from a resource pool used for D2D communication, and transmit information about the selected resources to the base station 200b.

The communication system 1 according to an embodiment of the present disclosure, by executing the series of operations illustrated in FIG. 12, is able to provide information for conducting inter-PLMN D2D communication to the terminal devices 100a and 100b.

Next, in technique 1-B, an operation example in which the terminal device 100a on the transmitting side transmits a D2D signal on the carrier of the terminal device 100a on the transmitting side will be illustrated. FIG. 13 is a flowchart illustrating example operation of a communication system 1 according to an embodiment of the present disclosure. FIG. 13 illustrates an operation example in which, in technique 1-B, the terminal device 100a on the transmitting side transmits a D2D signal on the carrier of the terminal device 100a on the transmitting side.

In the case of transmitting a D2D signal on the carrier of the terminal device 100a on the transmitting side, the terminal device 100a on the transmitting side uses the resources of its own cellular system to transmit a D2D signal to the terminal device 100b belonging to a different cellular system (step S141). The process of step S141 is executed by the control unit 143, for example. The terminal device 100b on the receiving side scans the band in which the D2D signal is transmitted in the cellular system of the terminal device 100a (step S142). The process of step S142 is executed by the control unit 143, for example. The terminal device 100b on the receiving side scans a band provided by information reported in advance, or information such as a whitelist.

The terminal device 100b on the receiving side scans the band in which the D2D signal is transmitted in the cellular system of the terminal device 100a, and upon discovering the cellular system (PLMN A) of the terminal device 100a (step S143), attempts to access the base station 200a of the discovered cellular system (step S144). The process of step S144 is executed by the control unit 143, for example. The base station 200a synchronizes with the accessing terminal device 100b, and transmits information about the resources to be used for D2D communication to the terminal device 100b (step S145). The process of step S145 is executed by the control unit 143, for example.

The information sent from the base station 200a to the terminal device 100b in the above step S145 may include, for example, band information about a band to be used for D2D communication in the carrier of the terminal device 100a on the transmitting side, synchronization signal timing information, and resource pool information (for example, information expressing types, timings, and the like as a bit map).

In the above step S145, the terminal device 100b, having obtained resource information from the base station 200a, scans the specified resources (step S146). The process of step S146 is executed by the control unit 143, for example. The terminal device 100a transmits a D2D signal to the terminal device 100b on the basis of the allocated resources, band, and timing from the base station 200a (step S147). The process of step S147 is executed by the control unit 143, for example. If data addressed to the terminal device 100*b* itself exists, the terminal device 100*b* decodes that data (step S148). The process of step S148 is executed by the control unit 143, for example. After decoding the data, the terminal device 100*b* may also provide feedback to the terminal device 100*a* on the transmitting side as appropriate.

The communication system 1 according to an embodiment of the present disclosure, by executing the series of operations illustrated in FIG. 13, is able to provide information for conducting inter-PLMN D2D communication to the terminal devices 100*a* and 100*b*.

In the technique 1-B, when the terminal device 100*a* on the transmitting side transmits a D2D signal on the carrier of the terminal device 100*a* on the transmitting side, the terminal device 100*b* on the receiving side scans the band in which the D2D signal is transmitted in the cellular system of the terminal device 100*a* in this way. However, in some cases, as illustrated in FIG. 14, for example, multiple base stations in the cellular system on the transmitting side may be present near the terminal device 100*b*.

If the terminal device 100*b* connects to a base station other than the intended base station 200*a* (for example, the base station 200*c*), the resource information for D2D communication will be different from that being used by the intended base station 200*a*, and thus no data will be found even if the specified resources are examined. In addition, if the terminal device 100*b* connects to a base station other than the intended base station 200*a* (for example, the base station 200*c*), and the base stations are not synchronized, the resource timings will be different, and thus no data will be found even if the specified resources are examined.

The former issue may be addressed by defining for each PLMN a discovery pool dedicated to inter-PLMN D2D communication. Even if the terminal device 100*b* mistakenly connects to the base station 200*c* to which the terminal device 100*a* is not camped on, by defining the same resource pool as the base station 200*a* for inter-PLMN D2D communication, the phenomenon of being unable to find any data may be avoided. In other words, a single resource pool for inter-PLMN D2D communication is constructed among multiple base stations.

By prescribing dedicated inter-PLMN resources in this way, the coordination of resources at least among PLMNs becomes possible. By coordinating the resource pool, collisions (overlap) in the resource pool on the time axis may be avoided. If the resource pools of multiple PLMNs overlap at the same time, a terminal device conducting D2D communication with a limited number of antennas may be unable to transmit at the same time, leading to inefficient transmission. By defining a dedicated resource pool for inter-PLMN D2D communication, the resource pools may be separated between a terminal device conducting existing D2D communication within its own cell and a terminal device conducting D2D communication across different PLMNs. Thus, effects such as interference caused by inter-PLMN D2D communication may be eliminated.

The latter issue may be addressed by having the terminal device 100*b* examine the next-strongest PSS/SS when data is not found correctly. In other words, the terminal device 100*b* reselects a base station when data is not found correctly. Additionally, by having the terminal device 100*b* obtain assistance information from a base station in advance via the SIB, synchronization with a neighboring cell may be made more efficient. The assistance information from a base station may be information such as synchronization offset information and cell list information for neighboring base stations, for example.

(Technique 1-C) Obtaining Information Directly from the Peer

Next, technique 1-C will be described. Obtaining information directly from the peer means that the terminal device 100*a* and the terminal device 100*b* communicate directly to obtain information, as indicated by the dashed line in FIG. 6. First, in technique 1-C, a case in which the terminal device 100*a* on the transmitting side transmits a D2D signal on the carrier of the terminal device 100*b* on the receiving side is conceivable. However, in this case, the terminal device 100*a* on the transmitting side has no advance information, and transmitting a signal on the peer's carrier is unrealistic from the perspective of interference. Consequently, in technique 1-C, the case in which the terminal device 100*a* on the transmitting side transmits a D2D signal on the carrier of the terminal device 100*b* on the receiving side will be excluded herein.

Next, in technique 1-C, an operation example in which the terminal device 100*a* on the transmitting side transmits a D2D signal on the carrier of the terminal device 100*a* on the transmitting side will be considered. FIG. 15 is a flowchart illustrating an operation example of a communication system 1 according to an embodiment of the present disclosure. FIG. 15 illustrates an operation example in which, in technique 1-C, the terminal device 100*a* on the transmitting side transmits a D2D signal on the carrier of the terminal device 100*a* on the transmitting side.

In the case of transmitting a D2D signal on the carrier of the terminal device 100*a* on the transmitting side, the terminal device 100*a* on the transmitting side uses the resources of its own cellular system to transmit a D2D signal to the terminal device 100*b* belonging to a different cellular system (step S151). The process of step S151 is executed by the control unit 143, for example. The terminal device 100*b* on the receiving side scans the band in which the D2D signal is transmitted in the cellular system of the terminal device 100*a* (step S152). The process of step S152 is executed by the control unit 143, for example. The terminal device 100*b* on the receiving side scans a band provided by information reported in advance, or information such as a whitelist.

The terminal device 100*b* on the receiving side detects a D2DSS for the band in which the terminal device 100*a* on the transmitting side is transmitting a D2D signal (step S153). The process of step S153 is executed by the control unit 143, for example. After detecting the D2DSS, the terminal device 100*b* on the receiving side decodes the PD2DSCH and obtains resource information about the signal transmitted to the terminal device 100*b* (step S154). The process of step S154 is executed by the information acquisition unit 141, for example. After decoding the PD2DSCH and obtaining the resource information, the terminal device 100*b* on the receiving side scans resources on the basis of the resource information, and decodes a signal addressed to the terminal device 100*b* itself if such a signal exists (step S155). The process of step S155 is executed by the control unit 143, for example. After decoding the data, the terminal device 100*b* may also provide feedback to the terminal device 100*a* on the transmitting side as appropriate.

In inter-PLMN D2D communication, the sharing of resource pool information among PLMNs in advance is not anticipated. Consequently, it is desirable for the terminal device 100*a* on the transmitting side to notify the terminal device 100*b* on the receiving side about information related to the resource pool every time inter-PLMN D2D communication is conducted. The terminal device 100*a* on the transmitting side notifies the terminal device 100*b* on the receiving side of the following parameters using the PD2DSCH. This notification is executed by the control unit 143, for example.

Information about a resource pool allocated for inter-PLMN D2D communication by the base station 200a to which the terminal device 100a on the transmitting side is camped on Information about a predetermined (preconfigured) resource pool for inter-PLMN D2D communication In the case of transmitting the preconfigured resource pool information, the terminal device 100a on the transmitting side notifies the terminal device 100b on the receiving side of index information or the like. This notification is executed by the control unit 143, for example.

The communication system 1 according to an embodiment of the present disclosure, by executing the series of operations illustrated in FIG. 15, is able to provide information for conducting inter-PLMN D2D communication from the terminal device 100a to the terminal device 100b.

1.3.2. Second Operation Example (1) Operation Example for Issue 2-1

Next, an operation example when synchronizing with the carrier on which a D2D signal is transmitted given as the above Issue 2-1 will be described. In inter-PLMN D2D communication, the following four techniques by which the terminal device 100b on the receiving side may synchronize with the carrier on which a D2D signal is transmitted will be considered.

(Technique 1) Prescribing a measurement time for inter-PLMN D2D communication (Technique 2) Providing predetermined information among PLMNs (Technique 3) Deciding a CC to use for transmission using a terminal ID (Technique 4) Using information about the timing at which a synchronization signal is transmitted Hereinafter, the four techniques above will be described in order.

(Technique 1) Prescribing a Measurement Time for Inter-PLMN D2D Communication

In order to effectively synchronize with the carrier on which a D2D signal is transmitted, with Technique 1, a D2D measurement timing configuration (D2DMTC) for inter-PLMN D2D communication is introduced into the terminal device 100b on the receiving side.

FIG. 16 is an explanatory diagram illustrating an example of D2DMTC used for inter-PLMN D2D communication. To receive target D2D communication, the terminal device 100b on the receiving side sequentially monitors CCs having a possibility of a D2D signal being transmitted. This monitoring is executed by the control unit 143, for example. The possibility of a D2D signal being transmitted herein refers to a predetermined band to be used for D2D communication, for example.

To enable the terminal device 100b on the receiving side to monitor CCs efficiently, the serving cell provides the terminal device 100b with a monitoring periodicity and a monitoring time. The terminal device 100b sequentially monitors CCs having a possibility of a D2D signal being transmitted.

The D2DMTC is made up of a target CC object and corresponding offset, periodicity, and duration. The offset is the system frame number (SFN) or the D2D frame number (DFN). The periodicity is the number of CCs, and is prescribed in consideration of the duration and the offset.

(Technique 2) Providing Predetermined Information Among PLMNs

In order to effectively synchronize with the carrier on which a D2D signal is transmitted, with Technique 2, a band in which D2D communication is likely to occur is decided in advance by a PLMN from among multiple CCs, and other PLMNs are notified in advance. When the terminal device 100b on the receiving side camps on to a PLMN, the terminal device 100b obtains information about the CC to be used for D2D communication via the MIB or the SIB. This obtaining is executed by the information acquisition unit 141, for example. Subsequently, the terminal device 100b on the receiving side monitors only the obtained target CC during inter-PLMN D2D communication. This monitoring is executed by the control unit 143, for example.

In this way, by having a PLMN decide a band in which D2D communication is likely to occur, and obtaining information about a CC to be used for inter-PLMN D2D communication, the terminal device 100b on the receiving side becomes able to decrease the number of CCs to monitor, and carry out efficient monitoring.

(Technique 3) Deciding a CC to Use for Transmission Using a Terminal ID

In order to effectively synchronize with the carrier on which a D2D signal is transmitted, with Technique 3, the CC to use for inter-PLMN D2D communication is decided using information unique to the terminal device 100b on the receiving side (for example, a terminal ID).

The terminal device 100a on the transmitting side decides the CC on which to conduct inter-PLMN D2D communication by using information unique to the terminal device 100b on the receiving side, such as a terminal ID, for example. This decision is executed by the control unit 143, for example. The terminal device 100a on the transmitting side computes the CC from the terminal ID using computation such as a modulo operation, for example. This computation is executed by the control unit 143, for example. For example, if the terminal ID of the terminal device 100b on the receiving side is "1234", and there are three CCs labeled CC1, CC2, and CC3, the operation becomes 1234 mod 3=1, and thus the terminal device 100a on the transmitting side conducts inter-PLMN D2D communication using CC1.

Similarly, the terminal device 100b on the receiving side decides the CC to scan by using unique information, such as a terminal ID, for example. This decision is executed by the control unit 143, for example.

By deciding the CC to use for inter-PLMN D2D communication by using information unique to the terminal device 100b on the receiving side (for example, a terminal ID) in this way, it becomes possible to unique specify one CC to use for inter-PLMN D2D communication with respect to one PLMN, and it becomes possible to decrease the load on the terminal device 100b on the receiving side.

(Technique 4) Using Information About the Timing at which a Synchronization Signal is Transmitted Measurement having a duration of 40 ms is extremely time-consuming, and becomes a large load for a terminal device 100b on the receiving side measuring multiple carriers. Accordingly, with Technique 4, the terminal device 100b on the receiving side conducts measurement efficiently by using information about the timing at which a synchronization signal is transmitted from the terminal device 100a on the transmitting side (herein designated the synchronization signal occasion (SSO)). The SSO includes information about an offset value and a period.

The following three methods will be given as methods of realizing Technique 4. Note that if Technique 4 is used, the terminal device 100b on the receiving side becomes able to pinpoint the synchronization signal for measurement, and thus it is sufficient for the duration to be equal to or greater than a lower limit of 1 ms.

(Technique 4-1)

The SSO timing information is adjusted in advance among the PLMNs. The terminal device 100b on the receiving side obtains the SSO timing information and target carrier information from the local base station 200b via the SIB, and prescribes the D2DMTC to match the SSO timing.

(Technique 4-2)

The terminal device 100b on the receiving side is notified of SSO information from the base station 200a on the transmitting side via the SIB. This is technique in which the terminal device 100b on the receiving side obtains information about the peer by temporarily connecting to the base station 200a on the transmitting side. With Technique 4-2, the terminal device 100b on the receiving side prescribes the D2DMTC based on the SSO acquired from the base station 200a on the transmitting side.

(Technique 4-3)

With Technique 4-3, information about the measurement target and SSO information is associated in advance, and the terminal device 100b on the receiving side obtains SSO configuration information by using information such as the cell ID of the measurement target. This obtaining is executed by the information acquisition unit 141, for example. The terminal device 100b may also compute the SSO configuration information using a computational method such as a mod operation. Subsequently, with Technique 4-3, the terminal device 100b on the receiving side prescribes the D2DMTC based on the obtained or computed SSO. This prescribing is executed by the control unit 143, for example.

According to any method discussed above, the terminal device 100b on the receiving side becomes able to synchronize with the carrier on which a D2D signal is transmitted in inter-PLMN D2D communication.

(2-2) Operation Example for Issue 2-2

Next, an operation example of efficient carrier scanning by the receiving terminal given as the above Issue 2-2 will be described.

In inter-PLMN D2D communication, the terminal device 100b on the receiving side is uninterested in intra-PLMN signals sent on the CCs of the terminal device 100a on the transmitting side. Accordingly, to address Issue 2-2, the transmission CCs or transmission resource pools are operated separately for intra-PLMN and inter-PLMN D2D communication, and the terminal device 100b on the receiving side of inter-PLMN D2D communication is configured to scan the CCs or the resource pool dedicated to inter-PLMN D2D communication.

If the terminal device 100b on the receiving side learns that the terminal device 100b is scanning an intra-PLMN CC or resource pool, the terminal device 100b immediately stops scanning and switches to scanning the signals of interest, or in other words, the inter-PLMN transmission CCs or transmission resource pool.

In this way, the communication system 1 according to an embodiment of the present disclosure, by operating with separate transmission CCs or transmission resource pools for intra-PLMN and inter-PLMN D2D communication, is able to realize efficient scanning by the terminal device 100b on the receiving side.

As an example, the case of receiving an instruction to perform inter-PLMN communication from a higher layer will be described.

Specifically, the communication system 1 according to an embodiment of the present disclosure groups CCs or resource pools into the following three types. As discussed above, by prescribing dedicated inter-PLMN resources in this way, the coordination of resources at least for inter-PLMN D2D communication becomes possible. By coordinating the resource pool, collisions (overlap) in the resource pool on the time axis may be avoided.

A: Dedicated intra-PLMN resources

B: Dedicated inter-PLMN resources

C: Resources usable for both intra/inter-PLMN communication

Note that the CCs or resource pools may also be grouped not into the above three types, but into two types according to whether or not the resources are dedicated intra-PLMN resources.

Subsequently, the communication system 1 according to an embodiment of the present disclosure adds attribute information for identifying a group to each CC or resource pool. The attribute information is reported to the terminal device 100b on the receiving side via the MINB or the SIB of the base station, via the PD2DSCH from the terminal device 100b on the receiving side, or using some signaling of D2DSS sequence information. The attribute information is acquired by the information acquisition unit 141, for example.

In particular, in the case of using D2DSS sequence information, the terminal device 100b on the receiving side decodes the D2DSS sequence to determine which attribute of the above A to C belongs to a target CC. In the current specifications, IDs from 0 to 335 are available for the D2DSS, of which the IDs {0-167} are allocated for in-coverage use, and the IDs {168-335} are allocated for out-of-coverage use. In the communication system 1 according to an embodiment of the present disclosure, the IDs for in-coverage use are further allocated into three groups, such as A: {0-55}, B: (56-1111, and C: {111-167}, for example.

By allocating IDs in this way, the terminal device 100b on the receiving side becomes able to judge whether or not a signal is of interest, or in other words whether or not a signal is an inter-PLMN transmission CC, during the stage of decoding the D2DSS, and wasted scanning is no longer necessary.

1.3.3. Third Operation Example

Next, an operation example of realizing a mechanism enabling efficient replies in inter-PLMN D2D communication given as the above Issue 3 will be described.

First, an operation example in which the terminal device 100a on the transmitting side transmits a D2D signal on the carrier of the terminal device 100b on the receiving side will be illustrated. In this case, the terminal device 100b on the receiving side replies to the terminal device 100a on the transmitting side on its own carrier.

In the case of the terminal device 100b on the receiving side replying to the terminal device 100a on the transmitting side on its own carrier, the following two methods are conceivable.

(Method 1) Replying by executing similar inter-PLMN D2D communication process (Method 2) The terminal device 100a on the transmitting side designating resources for replying In the case of the above Method 1, the terminal device 100b on the receiving side replies by executing an inter-PLMN D2D communication process similar to the terminal device 100a on the transmitting side. However, replying by executing a similar inter-PLMN D2D communication process is undesirable from an efficiency standpoint.

In the case of the above Method 2, the terminal device 100a on the transmitting side designates resources for replying, and thus the terminal device 100b on the receiving side simply replies using the designated resources, without requiring a complicated procedure. Additionally, the following methods are conceivable as methods by which the terminal device 100a on the transmitting side designates resources for replying.

(Method 2-1) Designating resources for replying in advance (Method 2-2) Replying using a section of the same resources with a prescribed time shift (Method 2-3) Deciding in advance a rule on the usage of resources for transmission and reply (Method 2-4) Replying using the normal D2D process (Method 2-1) Designating Resources for Replying in Advance Method 2-1 is a method in which the terminal device 100a on the transmitting side designates resources for replying to the terminal device 100b on the receiving side in advance, and reports the designated resource information and transmit power information from the terminal device 100a on the transmitting side to the terminal device 100b on the receiving side via the PD2DSCH. This reporting is executed by the control unit 143, for example. The terminal device 100b on the receiving side replies to the terminal device 100a on the transmitting side using the reported resources for replying. This reply is executed by the control unit 143, for example. The terminal device 100a on the transmitting side may also subdivide the resources to designate in units of resource pools, for example. The terminal device 100a on the transmitting side monitors the designated resources in advance, and waits for a reply from the terminal device 100b on the receiving side. This monitoring is executed by the control unit 143, for example.

(Method 2-2) Replying Using a Section of the Same Resources with a Prescribed Time Shift Method 2-2 is a method in which the terminal device 100b on the receiving side replies using the same resources as the resources used by the terminal device 100a on the transmitting side, but in a section shifted by a prescribed time from the time at which the terminal device 100a on the transmitting side transmitted the D2D signal. This shift value X is taken to be reported from the terminal device 100a on the transmitting side to the terminal device 100b on the receiving side in advance via the PD2DSCH.

(Method 2-3) Deciding in Advance a Rule on the Usage of Resources for Transmission and Reply Method 2-3 is a method in which the terminal device 100a on the transmitting side and the terminal device 100b on the receiving side decide in advance a rule on the usage of resources for transmission and reply. In the case of using Method 2-3, the terminal device 100b on the receiving side is able to reply by uniquely specifying a resource for replying from the resource used by the terminal device 100a on the transmitting side to transmit the signal. The terminal device 100a on the transmitting side similarly monitors the reply resource used by the terminal device 100b on the receiving side, and receives a signal.

(Method 2-4) Replying Using the Normal D2D Process

Method 2-4 is a method in which a reply is issued by using the normal D2D process, or in other words, the intra-PLMN D2D communication process. In the case of using Method 2-4, the terminal device 100a on the transmitting side stays in the band of the cellular system used by the terminal device 100b on the receiving side at least, and waits for a reply from the terminal device 100b on the receiving side. However, this method is inefficient for the terminal device 100a on the transmitting side in situations where the existence of a reply from the terminal device 100b on the receiving side is unknown.

Consequently, in the case of using Method 2-4, the terminal device 100a on the transmitting side additionally uses at least one of the following three methods.

(A) Adding information indicating that a reply is required (B) Reporting a time during which to wait for a reply (C) Prescribing in advance a time during to wait for a reply In the case of using the above method (A), the terminal device 100b on the receiving side must reply. In the case of using the above methods (B) or (C), the terminal device 100b on the receiving side is required to reply within the time designated by the terminal device 100a on the transmitting side.

The foregoing illustrates methods by which the terminal device 100a on the transmitting side designates resources for replying, but the information about resources for replying may also be reported by the base station 200b in the local cell of the terminal device 100b on the receiving side. In the case of the terminal device 100b on the receiving side acquiring information about resources for replying from the base station 200b, the terminal device 100a on the transmitting side transmits the information about the resources for replying to the base station 200b, and the base station 200b reports the information to the terminal device 100b on the receiving side.

In this way, when the terminal device 100a on the transmitting side transmits a D2D signal on the carrier of the terminal device 100b on the receiving side, the terminal device 100b on the receiving side decides in advance the resources for replying or acquires information about resources for replying from the terminal device 100a on the transmitting side, and thereby is able to efficiently respond to the terminal device 100a on the transmitting side.

Next, an operation example in which the terminal device 100a on the transmitting side transmits a D2D signal on the carrier of the terminal device 100a on the transmitting side will be illustrated. In this case, the terminal device 100b on the receiving side that receives the D2D signal replies on the carrier of the terminal device 100a on the transmitting side. Also, the terminal device 100b on the receiving side that receives a D2D signal desirably replies without affecting PLMN_A at least.

In the case of the terminal device 100b on the receiving side replying to the terminal device 100a on the transmitting side on the carrier of the terminal device 100a on the transmitting side, the following two methods are conceivable.

(Method 1) Replying by executing similar inter-PLMN D2D communication process (Method 2) The terminal device 100a on the transmitting side designating resources for replying In the case of the above Method 1, the terminal device 100b on the receiving side replies by executing an inter- PLMN D2D communication process similar to the terminal device 100a on the transmitting side. However, replying by executing a similar inter-PLMN D2D communication process is undesirable from an efficiency standpoint.

In the case of the above Method 2, the terminal device 100a on the transmitting side designates resources for replying, and thus the terminal device 100b on the receiving side simply replies using the designated resources, without requiring a complicated procedure. Additionally, the following methods are conceivable as methods by which the terminal device 100a on the transmitting side designates resources for replying.

(Method 2-1) Designating resources for replying in advance (Method 2-2) Replying using a section of the same resources with a prescribed time shift (Method 2-3) Deciding in advance a rule on the usage of resources for transmission and reply (Method 2-4) Replying using the normal D2D process (Method 2-1) Designating Resources for Replying in Advance Method 2-1 is a method in which the terminal device 100a on the transmitting side designates resources for replying to the terminal device 100b on the receiving side in advance, and reports the designated resource information and transmit power information from the terminal device 100a on the transmitting side to the terminal device 100b on the receiving side via the PD2DSCH. The terminal device 100b on the receiving side replies to the terminal device 100a on the transmitting side using the reported resources for replying. This reply is executed by the control unit 143, for example. The terminal device 100a on the transmitting side may also subdivide the resources to designate in units of resource pools, for example. The terminal device 100a on the transmitting side monitors the designated resources in advance, and waits for a reply from the terminal device 100b on the receiving side. This monitoring is executed by the control unit 143, for example.

(Method 2-2) Replying Using a Section of the Same Resources with a Prescribed Time Shift Method 2-2 is a method in which the terminal device 100b on the receiving side replies using the same resources as the resources used by the terminal device 100a on the transmitting side, but in a section shifted by a prescribed time from the time at which the terminal device 100a on the transmitting side transmitted the D2D signal. This shift value X is taken to be reported from the terminal device 100a on the transmitting side to the terminal device 100b on the receiving side in advance via the PD2DSCH. This reporting is executed by the control unit 143, for example.

(Method 2-3) Deciding in Advance a Rule on the Usage of Resources for Transmission and Reply Method 2-3 is a method in which the terminal device 100a on the transmitting side and the terminal device 100b on the receiving side decide in advance a rule on the usage of resources for transmission and reply. In the case of using Method 2-3, the terminal device 100b on the receiving side is able to reply by uniquely specifying resources for replying from the resources used by the terminal device 100a on the transmitting side to transmit the signal. The terminal device 100a on the transmitting side similarly monitors the reply resource used by the terminal device 100b on the receiving side, and receives a signal. This monitoring is executed by the control unit 143, for example.

(Method 2-4) Replying Using the Normal D2D Process

Method 2-4 is a method in which a reply is issued by using the normal D2D process, or in other words the intra-PLMN D2D communication process. In the case of using Method 2-4, the terminal device 100a on the transmitting side may additionally use at least one of the following three methods.

(A) Adding information indicating that a reply is required (B) Reporting a time to wait for a reply (C) Prescribing in advance a time during to wait for a reply In the case of using the above method (A), the terminal device 100b on the receiving side must reply. In the case of using the above methods (B) or (C), the terminal device 100b on the receiving side is required to reply within the time designated by the terminal device 100a on the transmitting side.

The foregoing illustrates methods by which the terminal device 100a on the transmitting side designates resources for replying, but the information about resources for replying may also be reported by the base station 200a in the local cell of the terminal device 100a on the transmitting side. In the case of the terminal device 100b on the receiving side acquiring information from the base station 200a in the local cell of the terminal device 100a on the transmitting side, the terminal device 100a on the transmitting side transmits the information about the resources for replying to the base station 200a, and the base station 200a reports the information to the terminal device 100b on the receiving side.

In this way, when the terminal device 100a on the transmitting side transmits a D2D signal on the carrier of the terminal device 100a on the transmitting side, the terminal device 100b on the receiving side decides in advance the resources for replying or acquires information about resources for replying from the terminal device 100a on the transmitting side, and thereby is able to efficiently respond to the terminal device 100a on the transmitting side.

2. APPLICATION EXAMPLES

The technology of the present disclosure is applicable to various products. For example, control entities 300a and 300b may be realized as any type of server such as a tower server, a rack server, and a blade server. The control entities 300a and 300b may be a control module (such as an integrated circuit module including a single die, and a card or a blade that is inserted into a slot of a blade server) mounted on a server.

For example, base stations 200a and 200b may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the base stations 200a and 200b may be realized as any other types of base stations such as a NodeB and a base transceiver station (BTS). The base stations 200a and 200b may include a main body (that is also referred to as a base station device) configured to control radio communication, and one or more remote radio heads (RRH) disposed in a different place from the main body. Additionally, various types of terminals to be discussed later may also operate as the base stations 200a and 200b by temporarily or semi-permanently executing a base station function.

For example, terminal devices 100a and 100b may be realized as a mobile terminal such as a smartphone, a tablet personal computer (PC), a notebook PC, a portable game terminal, a portable/dongle type mobile router, and a digital camera, or an in-vehicle terminal such as a car navigation device. The terminal devices 100a and 100b may also be realized as a terminal (that is also referred to as a machine type communication (MTC) terminal) that performs machine-to-machine (M2M) communication. Furthermore, the terminal devices 100a and 100b may be a radio communication module (such as an integrated circuit module including a single die) mounted on each of the terminals.

(2-1. Application Example Regarding Control Entity)

FIG. 17 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

(2-2. Application Examples Regarding Base Station)

First Application Example

FIG. 18 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 18. For example, the multiple antennas 810 may be compatible with multiple frequency bands used by the eNB 800. Although FIG. 18 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 18. For example, the multiple BB processors 826 may be compatible with multiple frequency bands used by the eNB 800. The radio communication interface 825 may include the multiple RF circuits 827, as illustrated in FIG. 18. For example, the multiple RF circuits 827 may be compatible with multiple antenna elements. Although FIG. 18 illustrates the example in which the radio communication interface 825 includes the multiple BB processors 826 and the multiple RF circuits 827, the radio communication interface 825 may also include a single BB processor 826 or a single RF circuit 827.

Second Application Example

FIG. 19 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 19.

For example, the multiple antennas 840 may be compatible with multiple frequency bands used by the eNB 830. Although FIG. 19 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 18.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 18, except the BB processor 856 is connected to the RF circuit 864 of the RRH 860 via the connection interface 857. The radio communication interface 855 may include the multiple BB processors 856, as illustrated in FIG. 19. For example, the multiple BB processors 856 may be compatible with multiple frequency bands used by the eNB 830. Although FIG. 19 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 19. For example, the multiple RF circuits 864 may support multiple antenna elements. Although FIG. 19 illustrates the example in which the radio communication interface 863 includes the multiple RF circuits 864, the radio communication interface 863 may also include a single RF circuit 864.

In the eNB 800 and the eNB 830 illustrated in FIGS. 18 and 19, one or more of the structural elements (the information acquisition unit 251 and/or the control unit 253) included in the processing unit 250 described with reference to FIG. 8 may be implemented the radio communication interface 855 and/or the radio communication interface 863. Alternatively, at least some of these structural elements may be implemented in the controller 851. As an example, the eNB 830 may be equipped with a module that includes all or part of the radio communication interface 855 (for example, the BB processor 856) and/or the controller 851, and the above one or more structural elements may be implemented in this module. In this case, the above module may also store a program causing a processor to function as the above one or more structural elements (in other words, a program causing a processor to execute the operations of the above one or more structural elements), and execute the program. As another example, a program causing a processor to function as the above one or more structural elements may be installed onto the eNB 830, and the radio communication interface 855 (for example, the BB processor 856) and/or the controller 851 may execute the program. As above, the eNB 830, the base station device 850, or the above module may be provided as a device equipped with the above one or more structural elements, or a program causing a processor to function as the above one or more structural elements may be provided. Additionally, a readable recording medium storing the above program may also be provided.

In addition, in the eNB 830 illustrated in FIG. 19, for example, the radio communication unit 220 described with reference to FIG. 8 may be implemented in the radio communication interface 863 (for example, the RF circuit 864). Also, the antenna unit 210 may be implemented in the antenna 840. Also, the network communication unit 230 may be implemented in the controller 851 and/or the network interface 853.

(2-3. Application Examples Regarding Terminal Device)

First Application Example

FIG. 20 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 20. Although FIG. 20 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 20. Although FIG. 20 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 20 via feeder lines, which are partially shown as dashed lines in the figure. The auxiliary controller 919 operates a minimum necessary function of the smartphone 900, for example, in a sleep mode.

In the smartphone 900 illustrated in FIG. 20, one or more of the structural elements (the information acquisition unit 141 and/or the control unit 143) included in the processing unit 140 described with reference to FIG. 7 may be implemented the radio communication interface 912. Alternatively, at least some of these structural elements may also be implemented in the processor 901 or the auxiliary controller 919. As an example, the smartphone 900 may be equipped with a module that includes all or part of the radio communication interface 912 (for example, the BB processor 913), the processor 901, and/or the auxiliary controller 919, and the above one or more structural elements may be implemented in this module. In this case, the above module may also store a program causing a processor to function as the above one or more structural elements (in other words, a program causing a processor to execute the operations of the above one or more structural elements), and execute the program. As another example, a program causing a processor to function as the above one or more structural elements may be installed onto the smartphone 900, and the radio communication interface 912 (for example, the BB processor 913), the processor 901, and/or the auxiliary controller 919 may execute the program. As above, the smartphone 900 or the above module may be provided as a device equipped with the above one or more structural elements, or a program causing a processor to function as the above one or more structural elements may be provided. Additionally, a readable recording medium storing the above program may also be provided.

In addition, in the smartphone 900 illustrated in FIG. 20, for example, the radio communication unit 120 described with reference to FIG. 7 may be implemented in the radio communication interface 912 (for example, the RF circuit 914). Also, the antenna unit 110 may be implemented in the antenna 916.

Second Application Example

FIG. 21 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 21. Although FIG. 21 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 21. Although FIG. 21 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 21 via feeder lines that are partially shown as dashed lines in the figure. The battery 938 accumulates power supplied form the vehicle.

In the car navigation device 920 illustrated in FIG. 21, one or more of the structural elements (the information acquisition unit 141 and/or the control unit 143) included in the processing unit 140 described with reference to FIG. 7 may be implemented the radio communication interface 933. Alternatively, at least some of these structural elements may be implemented in the processor 921. As an example, the car navigation device 920 may be equipped with a module that includes all or part of the radio communication interface 933 (for example, the BB processor 934) and/or the processor 921, and the above one or more structural elements may be implemented in this module. In this case, the above module may also store a program causing a processor to function as the above one or more structural elements (in other words, a program causing a processor to execute the operations of the above one or more structural elements), and execute the program. As another example, a program causing a processor to function as the above one or more structural elements may be installed onto the car navigation device 920, and the radio communication interface 933 (for example, the BB processor 934) and/or the processor 921 may execute the program. As above, the car navigation device 920 or the above module may be provided as a device equipped with the above one or more structural elements, or a program causing a processor to function as the above one or more structural elements may be provided. Additionally, a readable recording medium storing the above program may also be provided.

In addition, in the car navigation device 920 illustrated in FIG. 21, for example, the radio communication unit 120 described with reference to FIG. 7 may be implemented in the radio communication interface 933 (for example, the RF circuit 935). Also, the antenna unit 110 may be implemented in the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or vehicle) 940 may be provided as a device equipped with the above one or more structural elements included in the processing unit 140. The vehicle module 942 generates vehicle data such as vehicle speed, engine speed, and trouble information, and outputs the generated data to the in-vehicle network 941.

3. CONCLUSION

According to an embodiment of the present disclosure as described above, there are provided terminal devices 100a and 100b as well as base stations 200a and 200b capable of obtaining information efficiently, and conducting inter-PLMN D2D communication, which is D2D communication between terminals on different PLMNs.

To conduct inter-PLMN D2D communication, the terminal device 100a on the transmitting side and the terminal device 100b on the receiving side need to obtain information related to D2D communication. According to an embodiment of the present disclosure, information for conducting inter-PLMN D2D communication may be exchanged between the terminal devices 100a and 100b.

To conduct inter-PLMN D2D communication between the terminal device 100a on the transmitting side and the terminal device 100b on the receiving side, the terminal device 100a on the transmitting side and the terminal device 100b on the receiving side need to synchronize. According to an embodiment of the present disclosure, the terminal device 100b on the receiving side becomes able to synchronize with the carrier on which a D2D signal is transmitted in inter-PLMN D2D communication.

When conducting inter-PLMN D2D communication between the terminal device 100a on the transmitting side and the terminal device 100b on the receiving side, it is desirable for the terminal device 100b on the receiving side to scan the carrier efficiently. According to an embodiment of the present disclosure, the terminal device 100b on the receiving side scans a CC or resource pool dedicated to inter-PLMN, and thus is able to scan the carrier efficiently during inter-PLMN D2D communication.

When conducting inter-PLMN D2D communication between the terminal device 100a on the transmitting side and the terminal device 100b on the receiving side, a mechanism enabling efficient replies is desirable. According to an embodiment of the present disclosure, by having the terminal device 100a on the transmitting side designate resources for replying, the terminal device 100b on the receiving side is able to reply efficiently.

It should be understood by those skilled in the art that various modifications, combinations, sub-combinations and alterations may occur depending on design requirements and other factors insofar as they are within the scope of the appended claims or the equivalents thereof.

For example, although an example in which the control entity and the base station are separate devices is described, the present disclosure is not limited to such an example. For example, the control entity may be implemented in the base station.

As another example, in an embodiment of the present disclosure, an example of the communication system conforming to LTE or LTE-A is described, but the present disclosure is not limited to such an example. For example, the communication system may also be a system conforming to another communication standard.

Also, the processing steps in the processes in this specification are not strictly limited to being executed in a time series following the sequence described in the flowcharts and sequence diagrams. For example, the processing steps in a process may be executed in a sequence that differs from a sequence described herein as a flowchart or a sequence diagram, and furthermore may be executed in parallel.

In addition, it is also possible to create a computer program causing a processor (such as a CPU or DSP, for example) provided in a device in this specification (for example, a terminal device, a base station, or a control entity, or a module thereof) to function as the above devices (in other words, a computer program causing the process to execute the operations of the structural elements of the above devices). Also, a recording medium having such a computer program recorded thereon may also be provided. Also, a device equipped with memory storing the above computer program and one or more processors capable of executing the above computer program (for example, a complete product, or a module for a complete product (such as a part, a processing circuit, or a chip)) may also be provided. In addition, a method including the operations of the one or more structural elements of the above devices (such as an information acquisition unit and/or a control unit, for example) is also included in the technology according to an embodiment of the present disclosure.

In addition, the effects described in the present specification are merely illustrative and demonstrative, and not limitative. In other words, the technology according to an embodiment of the present disclosure can exhibit other effects that are evident to those skilled in the art along with or instead of the effects based on the present specification.

(1)

A device including:

an acquisition unit configured to acquire resource information indicating a radio resource of a peer to use in device-to-device communication between a first terminal device belonging to a first cellular system and a second terminal device belonging to a second cellular system; and a control unit configured to control the device-to-device communication between the first terminal device and the second terminal device based on the resource information acquired by the acquisition unit.

(2)

The device according to (1), wherein the acquisition unit acquires the resource information when the first terminal device transmits information by the device-to-device communication using a resource of the first cellular system.

(3)

The device according to (2), wherein the acquisition unit acquires the resource information from a first base station belonging to the first cellular system.

(4)

The device according to (3), wherein the acquisition unit references a resource pool defined for the device-to-device communication.

(5)

The device according to (3) or (4), wherein the acquisition unit reselects the first base station in a case of the resource information not being acquired.

(6)

The device according to (2), wherein the acquisition unit acquires the resource information from a second base station belonging to the second cellular system.

(7)

The device according to (6), wherein the resource information is information reported from a first base station belonging to the first cellular system to the second base station.

(8)

The device according to (2), wherein the acquisition unit acquires the resource information directly from the first terminal device.

(9)

The device according to any of (2) to (8), wherein in a case of transmitting a response from the second terminal device to the first terminal device, the control unit transmits a response using information regarding a radio resource designated by the first terminal device.

(10)

The device according to (9), wherein in a case of transmitting a response from the second terminal device to the first terminal device, the control unit transmits a response using a radio resource designated by the first terminal device.

(11)

The device according to (9), wherein in a case of transmitting a response from the second terminal device to the first terminal device, the control unit transmits a response using a resource in a section shifted a prescribed time away from a radio resource used by the first terminal device.

(12)

The device according to any of (2) to (11), wherein in a case of transmitting a signal from the first terminal device to the second terminal device, the control unit adds information regarding a response from the second terminal device to the first terminal device.

(13)

The device according to (1), wherein the acquisition unit acquires the resource information when the first terminal device transmits information by the device-to-device communication using a resource of the second cellular system.

(14)

The device according to (13), wherein the acquisition unit acquires the resource information from a second base station belonging to the second cellular system.

(15)

The device according to (14), wherein the resource information is information reported from a first base station belonging to the first cellular system to the second base station.

(16)
The device according to (14), wherein
the resource information is information reported from the second base station to a first base station belonging to the first cellular system.

(17)
The device according to (13), wherein
the control unit asks a second base station belonging to the second cellular system for a usage grant to use a resource of the second cellular system.

(18)
The device according to (17), wherein
the control unit asks for the usage grant from the first terminal device to the second base station directly.

(19)
The device according to (17), wherein
the control unit asks for the usage grant from the first terminal device to the second base station through a first base station belonging to the first cellular system.

(20)
The device according to any of (13) to (19), wherein
in a case of transmitting a response from the second terminal device to the first terminal device, the control unit transmits a response using information regarding a radio resource designated by the first terminal device.

(21)
The device according to (20), wherein
in a case of transmitting a response from the second terminal device to the first terminal device, the control unit transmits a response using a radio resource designated by the first terminal device.

(22)
The device according to (20), wherein
in a case of transmitting a response from the second terminal device to the first terminal device, the control unit transmits a response using a resource in a section shifted a prescribed time away from a radio resource used by the first terminal device.

(23)
The device according to any of (13) to (22), wherein
in a case of transmitting a signal from the first terminal device to the second terminal device, the control unit adds information regarding a response from the second terminal device to the first terminal device.

(24)
The device according to any of (1) to (23), wherein
the resource information includes information about a band to use in the device-to-device communication.

(25)
The device according to any of (1) to (24), wherein
the resource information includes information about a timing at which to conduct the device-to-device communication.

(26)
The device according to any of (1) to (25), wherein
the resource information includes information about a resource pool to use in the device-to-device communication.

(27)
The device according to any of (1) to (26), wherein
in a case of the first terminal device transmitting information by the device-to-device communication, the acquisition unit uses information unique to the second terminal device to acquire, from the first terminal device, a communication band in which to conduct the device-to-device communication.

(28)
The device according to (27), wherein
the communication band is a communication band in which to conduct the device-to-device communication, computed by the first terminal device using the information unique to the second terminal device.

(29)
The device according to (27), wherein
the communication band is grouped into a band having a possibility of the device-to-device communication being conducted and a band not having a possibility of the device-to-device communication being conducted.

(30)
The device according to (27), wherein
the acquisition unit acquires attribute information identifying the communication band.

(31)
The device according to (30), wherein
the attribute information is information identifying a band usable by first device-to-device communication between terminal devices belonging to a single cellular system, a band usable by second device-to-device communication between terminal devices belonging to difference cellular systems, and a band usable by both the first device-to-device communication and the second device-to-device communication.

(32)
The device according to any of (1) to (31), wherein
the acquisition unit acquires resource information indicating a radio resource on a cellular system to which the device itself does not belong, the radio resource being a radio resource to use in device-to-device communication between the first terminal device and the second terminal device.

(33)
The device according to any of (1) to (32), wherein
the device is the first terminal device or the second terminal device.

(34)
A method including:
acquiring resource information indicating a radio resource of a peer to use in device-to-device communication between a first terminal device belonging to a first cellular system and a second terminal device belonging to a second cellular system; and controlling the device-to-device communication between the first terminal device and the second terminal device based on the acquired resource information.

(35)
A device including:
circuitry configured to
acquire resource information indicating a radio resource for use in device-to-device (D2D) communication between a first terminal device belonging to a first public land mobile network (PLMN) and a second terminal device belonging to a second PLMN; and
control D2D communication between the first terminal device and the second terminal device based on the resource information.

(36)
The device of claim (35), wherein
the device is the first terminal device, and
the circuitry is configured to
acquire the resource information via the first PLMN; and control transmitting information from the first terminal device by the D2D communication based on the resource information acquired via the first PLMN.

(37)

The device of (36), wherein the circuitry is configured to acquire the resource information from a first base station belonging to the first PLMN.

(38)

The device of (37), wherein the circuitry is configured to reference a resource pool defined for the D2D communication.

(39)

The device of any of (37) to (38), wherein the circuitry is configured to acquire, from a base station of the first PLMN, parameters for communicating with a base station of the second PLMN.

(40)

The device of any of (36) to (39), wherein the circuitry is configured to acquire the resource information from a second base station belonging to the second PLMN.

(41)

The device of (35), wherein the device is the second terminal device, and the circuitry is configured to acquire the resource information directly from the first terminal device.

(42)

The device of (35), wherein the device is the first terminal device, and the circuitry is configured to acquire the resource information via the second PLMN; and control transmitting information from the first terminal device by the D2D communication based on the resource information acquired via the second PLMN.

(43)

The device of (42), wherein the circuitry is configured to acquire the resource information from a second base station belonging to the second PLMN.

(44)

The device of (43), wherein the resource information is reported from a first base station belonging to the first PLMN to the second base station; or the resource information is reported from the second base station to a first base station belonging to the first PLMN.

(45)

The device of (42), wherein the circuitry is configured to control transmitting a request to a second base station belonging to the second PLMN for a usage grant to use a resource of the second PLMN.

(46)

The device of (45), wherein the circuitry is configured to control transmitting the request for the usage grant directly to the second base station.

(47)

The device of (45), wherein the circuitry is configured to control transmitting the request for the usage grant to the second base station via a first base station belonging to the first PLMN.

(48)

The device of any of (35) to (37), wherein the resource information includes at least one of information about a resource pool to use in the D2D communication, a transmission power to use in the D2D communication, a band to use in the D2D communication, or information indicating a timing at which to conduct the D2D communication.

(49)

The device of any of (35) to (37), wherein the device is the second terminal device, and the circuitry is configured to use information unique to the second terminal device to acquire, from the first terminal device, a communication band in which to conduct the D2D communication.

(50)

The device of (49), wherein the communication band is grouped into a band available for the D2D communication and a band not available for the D2D communication.

(51)

The device of (49), wherein the circuitry is configured to acquire attribute information identifying the communication band.

(52)

The device of any of (35) to (51), wherein the circuitry is configured to acquire resource information indicating a radio resource on a PLMN to which the device does not belong, the radio resource being a radio resource to use in D2D communication between the first terminal device and the second terminal device.

(53)

The device of any of (35) to (52), wherein the circuitry is configured to acquire resource pool information and transmission power information used in D2D communication between the first terminal device the second terminal device.

(54)

A method including:

acquiring resource information indicating a radio resource for use in device-to-device (D2D) communication between a first terminal device belonging to a first public land mobile network (PLMN) and a second terminal device belonging to a second PLMN; and controlling D2D communication between the first terminal device and the second terminal device based on the resource information.

REFERENCE SIGNS LIST 1 communication system
100a, 100b terminal device
200a, 200b, base station
300a, 300b control entity

The invention claimed is:

1. A first terminal device, belonging to a first public land mobile network (PLMN), comprising:

circuitry configured to acquire resource information indicating a radio resource for use in direct communication between the first terminal device and a second terminal device belonging to a second PLMN without going through a first base station; and control the direct communication between the first terminal device and the second terminal device based on the resource information; and wherein the radio resource is other than a radio resource used in the communication between the first terminal device and the first base station belonging to the first PLMN.

2. The first terminal device of claim 1, wherein the circuitry is configured to acquire the resource information via the first PLMN.

3. The first terminal device of claim 2, wherein the circuitry is configured to acquire the resource information from a first base station belonging to the first PLMN.

4. The first terminal device of claim 3, wherein the circuitry is configured to reference a resource pool defined for the direct communication.

5. The first terminal device of claim 3, wherein the circuitry is configured to acquire, from a base station of the first PLMN, parameters for communicating with a base station of the second PLMN.

6. The first terminal device of claim 2, wherein the circuitry is configured to acquire the resource information from a second base station belonging to the second PLMN.

7. The first terminal device of claim 1, wherein
the circuitry is configured to
acquire the resource information via the second PLMN; and
control transmitting information from the first terminal device by the direct communication based on the resource information acquired via the second PLMN.

8. The first terminal device of claim 7, wherein the circuitry is configured to acquire the resource information from a second base station belonging to the second PLMN.

9. The first terminal device of claim 8, wherein
the resource information is reported from a first base station belonging to the first PLMN to the second base station; or
the resource information is reported from the second base station to a first base station belonging to the first PLMN.

10. The first terminal device of claim 7, wherein the circuitry is configured to control transmitting a request to a second base station belonging to the second PLMN for a usage grant to use a resource of the second PLMN.

11. The first terminal device of claim 10, wherein the circuitry is configured to control transmitting the request for the usage grant directly to the second base station.

12. The first terminal device of claim 10, wherein the circuitry is configured to control transmitting the request for the usage grant to the second base station via a first base station belonging to the first PLMN.

13. The first terminal device of claim 1, wherein the resource information includes at least one of information about a resource pool to use in the direct communication, a transmission power to use in the direct communication, a hand to use in the direct communication, or information indicating a timing at which to conduct the direct communication.

14. The first terminal device of claim 1, wherein
the device is the second terminal device, and
the circuitry is configured to use information unique to the second terminal device to acquire, from the first terminal device, a communication band in which to conduct the direct communication.

15. The first terminal device of claim 14, wherein the communication band is grouped into a band available for the direct communication and a band not available for the direct communication.

16. The first terminal device of claim 14, wherein the circuitry is configured to acquire attribute information identifying the communication band.

17. The first terminal device of claim 1, wherein the circuitry is configured to acquire resource information indicating a radio resource on a PLMN to which the device does not belong, the radio resource being a radio resource to use indirect communication between the first terminal device and the second terminal device.

18. The first terminal device of claim 1, wherein the circuitry is configured to acquire resource pool information and transmission power information used indirect communication between the first terminal device the second terminal device.

19. A method comprising:
acquiring resource information indicating a radio resource for use indirect communication between a first terminal device belonging to a first public land mobile network (PLMN) and a second terminal device belonging to a second PLMN without going through a first base station; and
controlling direct communication between the first terminal device and the second terminal device based on the resource information,
wherein the radio resource is other than a radio resource used in the communication between the first terminal device and a first base station belonging to the first PLMN.

* * * * *